(12) United States Patent
Varma et al.

(10) Patent No.: US 9,493,349 B2
(45) Date of Patent: Nov. 15, 2016

(54) HIGH AND RAPID HYDROGEN RELEASE FROM THERMOLYSIS OF AMMONIA BORANE NEAR PEM FUEL CELL OPERATING TEMPERATURE

(75) Inventors: Arvind Varma, West Lafayette, IN (US);
(Continued)

(73) Assignee: Purdue Research Foundation, West Lafayette, IN (US)

( * ) Notice: Subject to any disclaimer, the term of this patent is extended or adjusted under 35 U.S.C. 154(b) by 164 days.

(21) Appl. No.: 14/342,261

(22) PCT Filed: Sep. 2, 2012

(86) PCT No.: PCT/US2012/053574
§ 371 (c)(1),
(2), (4) Date: May 8, 2014

(87) PCT Pub. No.: WO2013/033672
PCT Pub. Date: Mar. 7, 2013

(65) Prior Publication Data
US 2015/0010835 A1    Jan. 8, 2015

Related U.S. Application Data

(60) Provisional application No. 61/530,420, filed on Sep. 2, 2011, provisional application No. 61/534,913, filed on Sep. 15, 2011.

(51) Int. Cl.
C01B 3/04      (2006.01)
H01M 8/06     (2016.01)
B01J 7/00      (2006.01)
H01M 8/04     (2016.01)
H01M 8/10     (2016.01)

(52) U.S. Cl.
CPC .. C01B 3/04 (2013.01); B01J 7/00 (2013.01); H01M 8/04067 (2013.01);
(Continued)

(58) Field of Classification Search
CPC .................. C01B 3/04; C01B 2203/066; B01J 7/00; H01M 8/04291; H01M 8/04164;
(Continued)

(56) References Cited

U.S. PATENT DOCUMENTS 5,315,885 A * 5/1994 Szinyei ............... F27D 3/16
                                                                422/80
7,618,600 B1   11/2009 Luo et al.
(Continued)

OTHER PUBLICATIONS

NIST Periodic Chart (NIST Periodic Table 2003 with Wayback web posting evidence Jan. 12, 2011).*
(Continued)

Primary Examiner — Patrick Ryan
Assistant Examiner — Aaron Greso
(74) Attorney, Agent, or Firm — Ice Miller LLP

(57) ABSTRACT

A system for generating and purifying hydrogen. To generate hydrogen, the system includes inlets configured to receive a hydrogen carrier and an inert insulator, a mixing chamber configured to combine the hydrogen carrier and the inert insulator, a heat exchanger configured to apply heat to the mixture of hydrogen carrier and the inert insulator, wherein the applied heat results in the generation of hydrogen from the hydrogen carrier, and an outlet configured to release the generated hydrogen. To purify hydrogen, the system includes a primary inlet to receive a starting material and an ammonia filtration subassembly, which may include an absorption column configured to absorb the ammonia into water for providing purified hydrogen at a first purity level. The ammonia filtration subassembly may also include an adsorbent member configured to adsorb ammonia from the starting material into an adsorbent for providing purified hydrogen at a second purity level.

8 Claims, 16 Drawing Sheets

(75) Inventors: Hyun Tae Hwang, West Lafayette, IN (US); Ahmad Al-Kukhun, Beaverton, OR (US)

(52) U.S. Cl.
CPC ..... *H01M 8/04164* (2013.01); *H01M 8/04291* (2013.01); *H01M 8/0606* (2013.01); *H01M 8/0662* (2013.01); *C01B 2203/066* (2013.01); *H01M 8/0687* (2013.01); *H01M 2008/1095* (2013.01); *Y02E 60/364* (2013.01); *Y02E 60/50* (2013.01)

(58) Field of Classification Search
CPC .............. H01M 8/0467; H01M 8/0662; H01M 8/0606; H01M 8/0687; H01M 2008/1095; Y02E 60/364; Y02E 60/50
See application file for complete search history.

(56) References Cited

U.S. PATENT DOCUMENTS

| | | |
|---|---|---|
| 7,846,240 B2 | 12/2010 | Gal et al. |
| 2004/0126288 A1 | 7/2004 | Fuju et al. |
| 2005/0158595 A1 | 7/2005 | Marsh et al. |
| 2005/0266281 A1* | 12/2005 | Adams ............... C01B 3/04 429/416 |
| 2006/0191199 A1* | 8/2006 | Rosenzweig ......... B01J 4/02 48/61 |
| 2009/0246575 A1* | 10/2009 | Zhao ................ B01J 31/121 429/421 |
| 2009/0249772 A1* | 10/2009 | Sato ................ B01D 53/32 60/297 |
| 2010/0104481 A1 | 4/2010 | Curello et al. |
| 2010/0221642 A1 | 9/2010 | Frahm et al. |
| 2010/0247425 A1 | 9/2010 | Scattergood et al. |
| 2011/0033342 A1 | 2/2011 | Horiguchi et al. |
| 2011/0076228 A1 | 3/2011 | Kelly et al. |

OTHER PUBLICATIONS

International Search Report, Nov. 16, 2012.
Written opinion of the International Searching Authority, Nov. 16, 2012.

* cited by examiner

HIGH AND RAPID HYDROGEN RELEASE FROM THERMOLYSIS OF AMMONIA BORANE NEAR PEM FUEL CELL OPERATING TEMPERATURE

PRIORITY

The present Application is related to, and claims the priority benefit of, and is a United States 35 U.S.C. §371 national stage entry of, International Patent Application Serial No. PCT/US2012/053574, filed Sep. 2, 2012, which is related to, and claims the priority benefit of U.S. Provisional Patent Application Ser. No. 61/530,420, filed on Sep. 2, 2011 and U.S. Provisional Patent Application Ser. No. 61/534,913, filed on Sep. 15, 2011. The contents of each of these applications are hereby incorporated by reference in their entirety into this disclosure.

This invention was made with government support under DE-FG36-06GO86050 awarded by the Department of Energy. The government has certain rights in the invention.

TECHNICAL FIELD

The present disclosure generally relates to fuel cells, and in particular to a method and system for hydrogen release near proton exchange membrane fuel cell operating temperatures and for removing ammonia byproduct from various hydrogen generation processes.

BACKGROUND

Hydrogen is a potential clean and environmentally-friendly energy carrier because, with oxygen in fuel cells to generate electricity, its only product is water. It has higher energy density on a mass basis than gasoline (120 MJ/kg for hydrogen vs. 44 MJ/kg for gasoline) but far lower volumetric energy density (0.01 MJ/L for hydrogen at STP vs. 32 MJ/L for gasoline). See Satyapal, S.; Petrovic, J.; Read, C.; Thomas, G.; Ordaz, G., The US Department of Energy's National Hydrogen Storage Project: Progress towards meeting hydrogen-powered vehicle requirements. *Catalysis Today* 2007, 120, 246-256. Therefore, Hydrogen powered fuel cell vehicles are expected to play a key role in future transportation systems since they produce only electricity, heat, and water at point of use. A major obstacle for the development of hydrogen powered vehicles is the lack of safe, light weight and energy efficient means for on-board hydrogen storage. See Schlapbach, L.; Zuttel, A., Hydrogen-storage materials for mobile applications. *Nature* 2001, 414, (6861), 353-358.

Current approaches for hydrogen storage include: compressed hydrogen gas, cryogenic and liquid hydrogen, sorbents, metal-organic frameworks (MOFs), metal hydrides and chemical hydrides. See Chen P, Xiong Z T, Luo J Z, Lin J Y, Tan K L. Interaction of Hydrogen with Metal Nitrides and Imides. Nature 2002; 420: 302-4; Satyapal S, Petrovic J, Read C, Thomas G, Ordaz G. The US Department of Energy's National Hydrogen Storage Project: Progress Towards Meeting Hydrogen-powered Vehicle Requirements. Catal Today 2007; 120: 246-56; Maus, S.; Hapke, J.; Ranong, C. N.; Wuchner, E.; Friedlmeier, G.; Wenger, D., Filling procedure for vehicles with compressed hydrogen tanks *International Journal of Hydrogen Energy* 2008, 33, (17), 4612-4621; Ahluwalia, R. K.; Peng, J. K., Dynamics of cryogenic hydrogen storage in insulated pressure vessels for automotive applications. *International Journal of Hydrogen Energy* 2008, 33, (17), 4622-4633; Juan-Juan, J.; Marco-Lozar, J. P.; Suarez-Garcia, F.; Cazorla-Amoros, D.; Linares-Solano, A., A comparison of hydrogen storage in activated carbons and a metal-organic framework (MOF-5). *Carbon* 2010, 48, (10), 2906-2909; Bluhm, M. E.; Bradley, M. G.; Butterick, R.; Kusari, U.; Sneddon, L. G., Amineborane-based chemical hydrogen storage: Enhanced ammonia borane dehydrogenation in ionic liquids. *J Am Chem Soc* 2006, 128, (24), 7748-7749; Marrero-Alfonso, E. Y.; Beaird, A. M.; Davis, T. A.; Matthews, M. A., Hydrogen Generation from Chemical Hydrides. *Industrial & Engineering Chemistry Research* 2009, 48, (8), 3703-3712; Mori D, Hirose K. Recent Challenges of Hydrogen Storage Technologies for Fuel Cell Vehicles. International Journal of Hydrogen Energy 2009; 34: 4569-74; and Schuth F. Challenges in Hydrogen Storage. Eur Phys J-Spec Top 2009; 176: 155-66.

Pressurized tanks and cryogenic liquid hydrogen provide viable means for stationary hydrogen storage, but challenges remain in their use for on-board vehicles. Their main disadvantages are the large physical volume required, and the energy penalty associated with compressing the gas to high pressures (typically 5,000-10,000 psi). There are also issues that have not been fully resolved, such as the problem of rapid loss of $H_2$ in an accident. Recently, a wide range of nanoporous materials has been studied as potential hydrogen storage media. The advantage of sorbent materials lies in their ready reversibility. Due to the weak interaction between molecular hydrogen and sorbent, however, this approach requires low temperatures (normally about 77° K) to obtain reasonable hydrogen uptake, which is difficult to maintain in a vehicle application.

Metal hydrides and chemical hydrides are the most promising approaches for hydrogen storage due to the high gravimetric capacity and moderate storage/release temperature. Metal and complex hydrides rely on stronger chemical interactions than sorbents, and thus can store hydrogen at higher temperatures. This approach provides superior hydrogen capacity 8-11 wt %. However, high temperatures (>300° C.) are required to liberate hydrogen, but this temperature level is not available in proton exchange membrane fuel cells ("PEM FCs"), which operate at about 85° C. Chemical hydrides offer the advantages of high hydrogen gravimetric capacity, along with ease of hydrogen release. Unlike reversible metal or complex hydrides, however, dehydrogenation process of chemical hydrides is not reversible. Thus, the spent material must be removed from the vehicle for off-board regeneration.

Among chemical hydrides, ammonia borane ($NH_3BH_3$, "AB") has attracted considerable interest as a promising hydrogen storage candidate because of its high hydrogen content (19.6 wt %), hydrogen release under moderate conditions, and stability at room temperature. See Stephens, F. H.; Pons, V.; Baker, R. T., Ammonia-borane: the hydrogen source par excellence? *Dalton Transactions* 2007, (25), 2613-2626; Wang P, Kang X D. Hydrogen-rich Boron-containing Materials for Hydrogen Storage. Dalton T 2008: 5400-13; and Hamilton, C. W.; Baker, R. T.; Staubitz, A.; Manners, I., B—N compounds for chemical hydrogen storage. *Chem Soc Rev* 2009, 38, (1), 279-293.

TABLE 1

Hydrolysis and Thermolysis Equations

| | | |
|---|---|---|
| Hydrolysis: | $NH_3BH_3 + 3H_2O \rightarrow B(OH)_3 + NH_3 + 3H_2$ | (1) |
| Thermolysis: | $NH_3BH_3 \rightarrow \frac{1}{x}(NH_2BH_2)_x + H_2$; (90-120° C.) | (2) |

TABLE 1-continued

Hydrolysis and Thermolysis Equations $$\frac{1}{x}(NH_2BH_2)_x \rightarrow \frac{1}{x}(NHBH)_x + H_2; (150\text{-}170° \text{ C.}) \quad (3)$$

$$\frac{1}{x}(NHBH)_x \rightarrow \frac{1}{x}(NBH)_x + 0.5H_2; (> 150° \text{ C.}) \quad (4)$$

$$\frac{1}{x}(NHBH)_x \rightarrow \frac{1}{x}(NB)_x + H_2; (> 500° \text{ C.}) \quad (5)$$

There are two distinct approaches for AB dehydrogenation: (1) hydrolysis using catalysts (Table 1, Eq. 1), which generates borates and ammonia, and (2) thermolysis (Table 1, Eq. 2-5), which generates various products such as (poly)aminoborane, (poly)iminoborane, cyclotriborazane, borazine ($N_3B_3H_6$), polyborazylene, etc. See Yan, J. M.; Zhang, X. B.; Akita, T.; Haruta, M.; Xu, Q., One-Step Seeding Growth of Magnetically Recyclable Au at Co Core-Shell Nanoparticles: Highly Efficient Catalyst for Hydrolytic Dehydrogenation of Ammonia Borane. *J Am Chem Soc* 2010, 132, (15), 5326-5327; Jiang, H. L.; Umegaki, T.; Akita, T.; Zhang, X. B.; Haruta, M.; Xu, Q., Bimetallic Au—Ni Nanoparticles Embedded in SiO2 Nanospheres: Synergetic Catalysis in Hydrolytic Dehydrogenation of Ammonia Borane. *Chem-Eur J* 2010, 16, (10), 3132-3137; Ramachandran, P. V.; Gagare, P. D., Preparation of ammonia borane in high yield and purity, methanolysis, and regeneration. *Inorg Chem* 2007, 46, (19), 7810-7817; Nylen, J.; Sato, T.; Soignard, E.; Yarger, J. L.; Stoyanov, E.; Haussermann, U., Thermal decomposition of ammonia borane at high pressures. *J Chem Phys* 2009, 131, (10), 104506 (1-7); Baitalow, F.; Wolf, G.; Grolier, J. P. E.; Dan, F.; Randzio, S. L., Thermal decomposition of ammonia-borane under pressures up to 600 bar. *Thermochim Acta* 2006, 445, (2), 121-125; Baitalow, F.; Baumann, J.; Wolf, G.; Jaenicke-Rossler, K.; Leitner, G., Thermal decomposition of B—N—H compounds investigated by using combined thermoanalytical methods. *Thermochim Acta* 2002, 391, (1-2), 159-168; Heldebrant, D. J.; Karkamkar, A.; Hess, N. J.; Bowden, M.; Rassat, S.; Zheng, F.; Rappe, K.; Autrey, T., The Effects of Chemical Additives on the Induction Phase in Solid-State Thermal Decomposition of Ammonia Borane. *Chem Mater* 2008, 20, (16), 5332-5336.

Hydrolysis provides low theoretical $H_2$ yield due to limited AB solubility in water and requires catalysts. See Metin O, Mazumder V, Ozkar S, Sun S S. Monodisperse Nickel Nanoparticles; and Their Catalysis in Hydrolytic Dehydrogenation of Ammonia Borane. J Am Chem Soc 2010; 132: 1468-9; and Wang P, Kang X D. Hydrogen-rich boron-containing materials for hydrogen storage. Dalton T 2008: 5400-13.

In addition, AB generates B—O bonds which are not preferred from the spent fuel regeneration viewpoint, and $NH_3$ which must be removed for use in proton exchange membrane fuel cells ("PEM FCs"). See Smythe N C, Gordon J C. Ammonia Borane as a Hydrogen Carrier: Dehydrogenation and Regeneration. Eur J Inorg Chem 2010: 509-21; Uribe F A, Gottesfeld S, Zawodzinski T A. Effect of Ammonia as Potential Fuel Impurity on Proton Exchange Membrane Fuel Cell Performance. J Electrochem Soc 2002; 149: A293-A6; Hwang H T, Al-Kukhun A, Varma A. Hydrogen for Vehicle Applications from Hydrothermolysis of Ammonia Borane: Hydrogen Yield, Thermal Characteristics, and Ammonia Formation. Industrial & Engineering Chemistry Research 2010; 49: 10994-1000; and Al-Kukhun A, Hwang H T, Varma A. A Comparison of Ammonia Borane Dehydrogenation Methods for Proton-Exchange-Membrane Fuel Cell Vehicles: Hydrogen Yield and Ammonia Formation and Its Removal. Ind. Eng. Chem. Res.: 10.1021/ie102157v.

On the other hand, thermolysis requires either relatively high temperature (>150° C.) to release 2 or 2.5 equivalents of hydrogen per AB, or relatively costly additives (which constitute weight penalty) for lower temperature operation and shorter induction period. See Baitalow, F.; Baumann, J.; Wolf, G.; Jaenicke-Rossler, K.; Leitner, G., Thermal decomposition of B—N—H compounds investigated by using combined thermoanalytical methods. *Thermochim Acta* 2002, 391, (1-2), 159-168; Heldebrant, D. J.; Karkamkar, A.; Hess, N. J.; Bowden, M.; Rassat, S.; Zheng, F.; Rappe, K.; Autrey, T., The Effects of Chemical Additives on the Induction Phase in Solid-State Thermal Decomposition of Ammonia Borane. *Chem Mater* 2008, 20, (16), 5332-5336; Neiner, D.; Karkamkar, A.; Linehan, J. C.; Arey, B.; Autrey, T.; Kauzlarich, S. M., Promotion of Hydrogen Release from Ammonia Borane with Mechanically Activated Hexagonal Boron Nitride. *J Phys Chem C* 2009, 113, (3), 1098-1103; Gutowska, A.; Li, L. Y.; Shin, Y. S.; Wang, C. M. M.; Li, X. H. S.; Linehan, J. C.; Smith, R. S.; Kay, B. D.; Schmid, B.; Shaw, W.; Gutowski, M.; Autrey, T., Nanoscaffold Mediates Hydrogen Release and the Reactivity of Ammonia Borane. *Angewandte Chemie-International Edition* 2005, 44, (23), 3578-3582; and Hu, M. G.; Geanangel, R. A.; Wendlandt, W. W., Thermal-Decomposition of Ammonia-Borane. *Thermochim Acta* 1978, 23, (2), 249-255. Above 500° C., complete dehydrogenation occurs forming boron nitride (BN). See Baitalow, F.; Baumann, J.; Wolf, G.; Jaenicke-Rossler, K.; Leitner, G., Thermal decomposition of B—N—H compounds investigated by using combined thermoanalytical methods. *Thermochim Acta* 2002, 391, (1-2), 159-168; Himmelberger D W, Alden L R, Bluhm M E, Sneddon L G. Ammonia Borane Hydrogen Release in Ionic Liquids. Inorg Chem 2009; 48: 9883-9; Himmelberger D W, Yoon C W, Bluhm M E, Carroll P J, Sneddon L G. Base-Promoted Ammonia Borane Hydrogen-Release. J Am Chem Soc 2009; 131: 14101-10; and Hu, M. G.; Geanangel, R. A.; Wendlandt, W. W., Thermal-Decomposition of Ammonia-Borane. *Thermochim Acta* 1978, 23, (2), 249-255. From a spent fuel regeneration viewpoint, however, BN is not preferred due to its high chemical and thermal stability. See Smythe, N. C.; Gordon, J. C., Ammonia Borane as a Hydrogen Carrier: Dehydrogenation and Regeneration. *Eur J Inorg Chem* 2010, (4), 509-521.

It has also been reported that even neat AB thermolysis generates some ammonia. See Hwang H T, Al-Kukhun A, Varma A. Hydrogen for Vehicle Applications from Hydrothermolysis of Ammonia Borane: Hydrogen Yield, Thermal Characteristics, and Ammonia Formation. Industrial & Engineering Chemistry Research 2010; 49: 10994-1000; Al-Kukhun A, Hwang H T, Varma A. A Comparison of Ammonia Borane Dehydrogenation Methods for Proton-Exchange-Membrane Fuel Cell Vehicles: Hydrogen Yield and Ammonia Formation and Its Removal. Ind. Eng. Chem. Res.: 10.1021/ie102157v; and Neiner D, Karkamkar A, Linehan J C, Arey B, Autrey T, Kauzlarich S M. Promotion of Hydrogen Release from Ammonia Borane with Mechanically Activated Hexagonal Boron Nitride. J Phys Chem C 2009; 113: 1098-103. Above 500° C., AB can be completely decomposed to form boron nitride (BN). For spent fuel regeneration, however, BN is not preferred due to its high chemical and thermal stability. See Smythe N C, Gordon J C. Ammonia Borane as a Hydrogen Carrier: Dehydrogenation and Regeneration. Eur J Inorg Chem 2010: 509-21.

For use in PEM FCs, ammonia and borazine (a cyclic volatile compound) need to be removed from the $H_2$ stream. It has been reported that as low as 13 ppm $NH_3$ can decrease the fuel cell performance, and that the degradation is irreversible for long term exposure (15 hr) to 30 ppm $NH_3$. See Uribe, F. A.; Gottesfeld, S.; Zawodzinski, T. A., Effect of ammonia as potential fuel impurity on proton exchange membrane fuel cell performance. *Journal of the Electrochemical Society* 2002, 149, (3), A293-A296. The U.S. Department of Energy (DOE) has set the target for ammonia concentration at <0.1 ppm in hydrogen for PEM FC. See SAE-J2719, Information Report on the Development of a Hydrogen Quality Guideline for Fuel Cell Vehicles. *Society of Automotive Engineers* 2008. While ammonia even in minute amounts is intolerable, ammonia is produced as a byproduct with most dehydrogenation processes.

Therefore, there is a need for an improved system and method which enables high liberation of hydrogen while minimizing ammonia formation. Additionally, an efficient process is needed to remove ammonia from a hydrogen carrier composition during hydrogen generation processes. In particular, a method and process to improve purity of the hydrogen stream entering the fuel cell is needed.

SUMMARY

For ammonia borane ($NH_3BH_3$, AB) dehydrogenation approach to be applicable to hydrogen-powered fuel cells, it will be advantageous to meet the following goals: sufficiently high hydrogen capacity, fast kinetics at PEM FC operating temperatures (<90° C.) to utilize waste heat from the fuel cell, little or no ammonia formation, and easily regenerable spent AB product. The system and method described in the present disclosure provided exceptionally high hydrogen yield (14-15 wt %, 2.1-2.3 $H_2$ molar equivalent) by neat AB thermolysis at 90° C. (near PEM fuel cell operating temperatures) with rapid kinetics, without the use of either catalyst or additives, along with only trace amount of $NH_3$ in the gaseous product. The spent AB solid product by the method according to the present disclosure is found to be polyborazylene-like species, which result from AB thermolysis to about $2H_2$ equivalent. The results presented here suggest that the method according to the present disclosure is advantageous for hydrogen storage, and could be used in PEM FC based vehicles.

The present disclosure provides disclosure of systems for generating hydrogen. In at least one embodiment, such a system includes an inlet configured to receive a hydrogen carrier, an inlet configured to receive an inert insulator, a mixing chamber configured to combine the hydrogen carrier and the inert insulator, a heat exchanger configured to apply heat to the mixture of hydrogen carrier and the inert insulator, wherein the applied heat results in generation of hydrogen from the hydrogen carrier, and an outlet configured to release the generated hydrogen.

A system for generating hydrogen according to at least one embodiment of the present disclosure comprises a first piston; a second piston; a cylinder, wherein the first piston and second piston are slidably positioned within the cylinder thereby creating a volume between the first piston and second piston; at least one inlet configured to receive a hydrogen carrier and an inert insulator, wherein the at least one inlet is in communication with the volume between the first piston and the second piston; a biasing member configured to bias the first piston toward the second piston; a heat exchanger configured to apply heat to the volume between the first piston and the second piston, wherein when the volume contains the hydrogen carrier and the inert insulator, the applied heat results in generation of hydrogen from the hydrogen carrier; and an outlet configured to release the generated hydrogen from the cylinder.

A method for generating hydrogen according to at least one embodiment of the present disclosure comprises the steps of loading a volume of a hydrogen carrier into a system for generating hydrogen; loading a volume of an inert insulator into the system for generating hydrogen; mixing the volume of the hydrogen carrier with the volume of the inert insulator; heating the mixture of inert hydrogen carrier and inert insulator; and reducing the volume expansion of the hydrogen carrier.

The inert insulator according to at least one embodiment of the present disclosure may be quartz wool. Additionally, the hydrogen carrier according to at least one embodiment of the present disclosure may be ammonia borane.

In addition, the present disclosure provides disclosure of hydrogen purification systems which, in at least one embodiment include a primary inlet to receive a starting material. A hydrogen purification according to at least one embodiment of the present disclosure comprises an ammonia filtration subassembly including 1) an absorption column configured to absorb the ammonia into water, the absorption column including a first inlet coupled to the primary inlet for receiving the starting material, a second inlet for receiving water, a first outlet for removing a water-ammonia mixture, and a second outlet for providing purified hydrogen at a first purity level; 2) an adsorbent member configured to adsorb ammonia from the starting material into an adsorbent, the adsorbent member including a third inlet coupled to the primary inlet, a third outlet for providing purified hydrogen at a second purity level; or 3) an absorption column configured to initially absorb substantially all of the ammonia into water, the absorption column including a first inlet coupled to the primary inlet for receiving the starting material, a second inlet for receiving water, a first outlet for removing a water-ammonia mixture and a second outlet for providing purified hydrogen at a first purity level, and an adsorbent member configured to adsorb essentially all of remaining ammonia present in the purified hydrogen at the first purity level into an adsorbent, the adsorbent member including a third inlet coupled to the second outlet for receiving the purified hydrogen at the first purity level, and a third outlet for providing purified hydrogen at a third purity level.

BRIEF DESCRIPTION OF DRAWINGS

(FIG. 3b) $T_{SP}$=90° C. with quartz wool (T90Q); and (FIG. 3c) polyborazylene.

DETAILED DESCRIPTION

Figure 1:
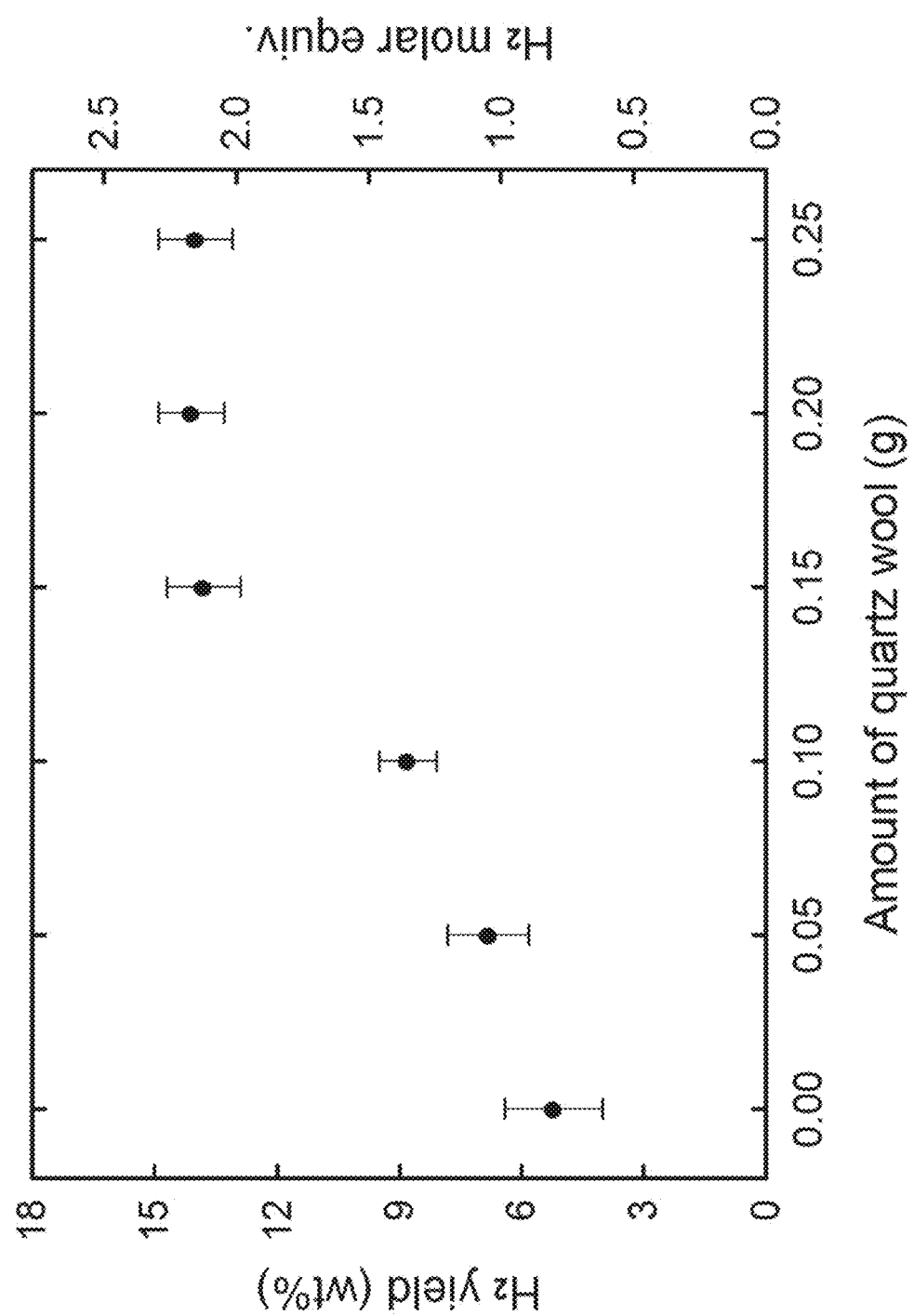
FIG. 1 is a graph of hydrogen ($H_2$) yield measured in percent weight vs. amounts of quartz wool measured in gram (g) according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel system and method have been developed to liberate high levels of hydrogen with minimal ammonia production. The system includes using inert insulation material in neat ammonia borane (NH$_3$BH$_3$, "AB") thermolysis near PEM FC operating temperatures (i.e., less than about 90° C.) along with rapid kinetics, without the use of either catalyst or chemical additives. According to at least one embodiment of the present disclosure, the inert insulation material is quartz wool.

Release of first and second moles of hydrogen from AB via thermolysis (Table 1, Eqs. 2 and 3, above) is exothermic. See Hamilton C W, Baker R T, Staubitz A, Manners I. B—N Compounds for Chemical Hydrogen Storage. Chem Soc Rev 2009; 38: 279-93; Baitalow F, Baumann J, Wolf G, Jaenicke-Rossler K, Leitner G. Thermal Decomposition of B—N—H Compounds Investigated by Using Combined Thermoanalytical Methods. Thermochim Acta 2002; 391: 159-68; and Neiner D, Karkamkar A, Linehan J C, Arey B, Autrey T, Kauzlarich S M. Promotion of Hydrogen Release from Ammonia Borane with Mechanically Activated Hexagonal Boron Nitride. J Phys Chem C 2009; 113: 1098-103. Thus, with effective heat management, utilizing the reaction exothermicity during the first H$_2$ release from AB could trigger release of second H$_2$.

Experiments were conducted with a 70 mL stainless steel reactor (e.g., Parr Instruments Inc., Model 4592) with external heating. The AB (97% pure, Sigma Aldrich) sample is placed in a small quartz vial (typically 3 mL) inside the reactor, under argon (99.99% pure) environment. For effective reaction heat management, some quartz wool (4 µm diameter) was added at the top of the AB sample (about 0.5 g). Starting at room temperature, with a 1° C./min heating rate, the reaction vessel was maintained for 2 hour hold at the set point value (T$_{SP}$, 90° C.). The reactor pressure and the temperature (sample and reactor) are monitored using online pressure and temperature transducers. The hydrogen generation was calculated using the gas composition analysis, along with pressure increase during the experiment. After cooling the reactor to room temperature at the end of the experiment, NH$_3$ was measured using Drager tube.

At PEM FC operating temperature in the absence of any additive, H$_2$-release from solid-state AB exhibits an induction period of up to 3 hr. See Heldebrant D J, Karkamkar A, Hess N J, Bowden M, Rassat S, Zheng F, Rappe K, Autrey T. The Effects of Chemical Additives on the Induction Phase in Solid-State Thermal Decomposition of Ammonia Borane. Chem Mater 2008; 20: 5332-6; Himmelberger D W, Alden L R, Bluhm M E, Sneddon L G. Ammonia Borane Hydrogen Release in Ionic Liquids. Inorg Chem 2009; 48: 9883-9; Himmelberger D W, Yoon C W, Bluhm M E, Carroll P J, Sneddon L G. Base-Promoted Ammonia Borane Hydrogen-Release. J Am Chem Soc 2009; 131: 14101-10; Neiner D, Karkamkar A, Linehan J C, Arey B, Autrey T, Kauzlarich S M. Promotion of Hydrogen Release from Ammonia Borane with Mechanically Activated Hexagonal Boron Nitride. J Phys Chem C 2009; 113: 1098-103; and Bluhm M E, Bradley M G, Butterick R, Kusari U, Sneddon L G. Amineborane-based Chemical Hydrogen Storage: Enhanced Ammonia Borane Dehydrogenation in Ionic Liquids. J Am Chem Soc 2006; 128: 7748-9. After hydrogen release begins, only about 1 equivalent of H$_2$ is obtained even with prolonged duration (>20 hr). For this reason, in prior studies reported in the literature, AB thermolysis has required temperature above 150° C. to provide 2 equivalent of hydrogen per AB (i.e. 13.1 wt % H$_2$). However, this temperature is generally too high to utilize waste heat from a PEM FC which is operated at about 85° C., thus the thermolysis process typically requires additional heat which constitutes an energy penalty.

According to at least one embodiment of the present disclosure, for effective reaction heat management, quartz wool was added at the top of the AB sample, which retains heat from the exothermic thermolysis reaction while permitting product H$_2$ to flow. FIG. 1 shows the effect of quartz wool amount on H$_2$ yield for neat AB thermolysis. It was found that the H$_2$ yield increases with the amount of quartz wool up to 0.15 g; thus, 5.2 wt % H$_2$ yield obtained in the absence of the quartz wool, and increased to about 14 wt % with 0.15 g quartz wool. Further increase in quartz wool amount did not increase H$_2$ yield.

Figure 2A:
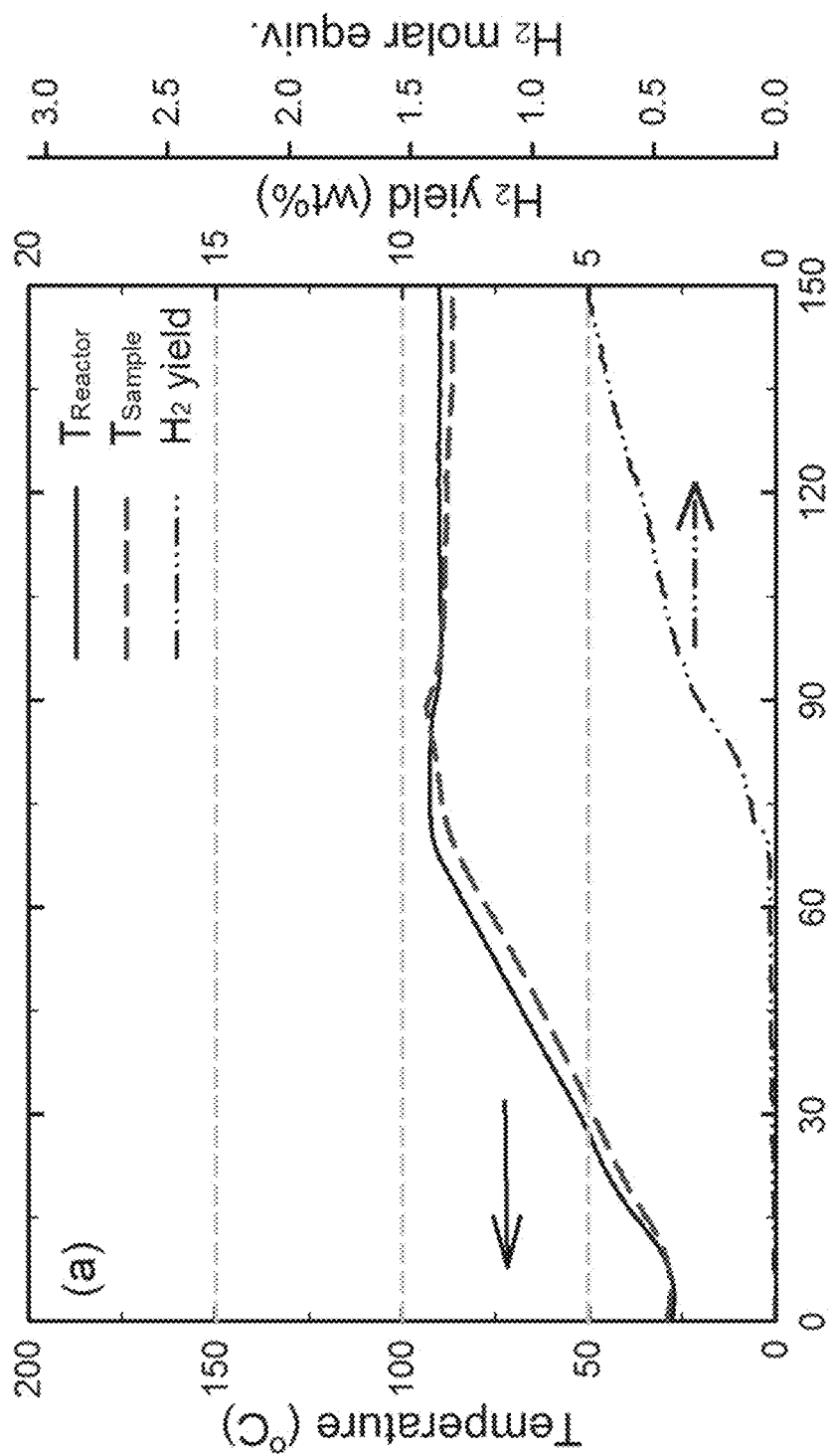
FIGS. 2a and 2b are graphs of temperature measured in ° C. and $H_2$ yield measured in percent weight vs. time measured in minutes for various conditions.
Figure 2B:
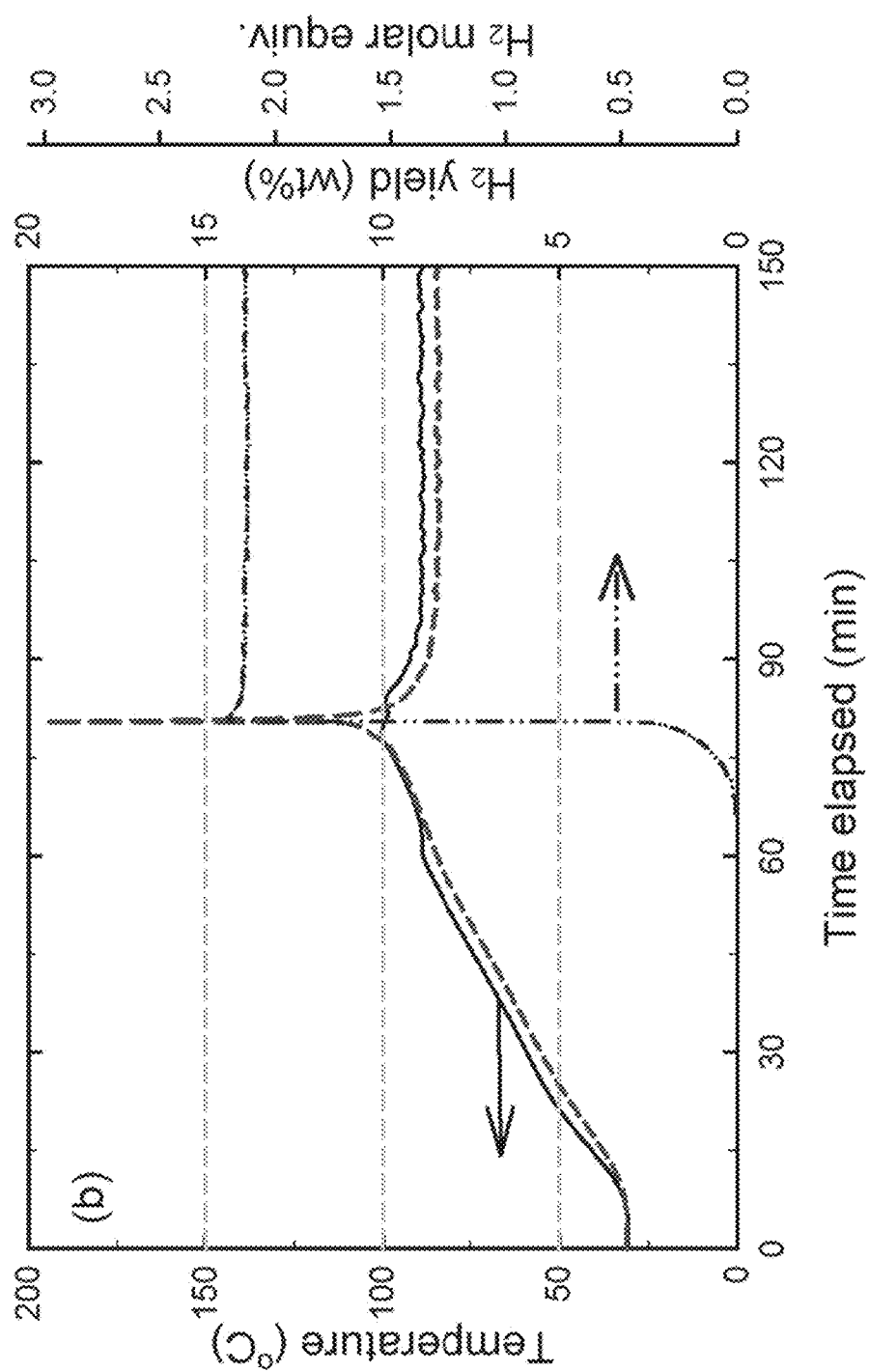

FIGS. 2a and 2b show the typical temperature and H$_2$ yield profiles with time for neat AB thermolysis at 14.7 psia and heating rate of 1° C./min for reactor set point temperatures (T$_{SP}$) 90° C. without quartz wool (T90), and T$_{SP}$ 90° C. with quartz wool (T90Q). For neat AB thermolysis without quartz wool, hydrogen gradually evolved with time after reaching 85-90° C. (FIG. 2a). For T90, after hydrogen release began, only 5 wt % H$_2$ yield was achieved in 90 min as shown in FIG. 2a. On the other hand, under effective heat management for T90Q, hydrogen yield of about 14 wt % was achieved and stabilized quickly after sharp heat evolution (FIG. 2b). The sample temperature increased sharply up to about 200° C. (sufficient to release the second H$_2$ mole from AB, see Table 1, Eq. 3), with simultaneous evolution of H$_2$. These unexpected results show that the heat released during the first decomposition step can drive the second step when the reaction heat is effectively managed.

Figure 2C:
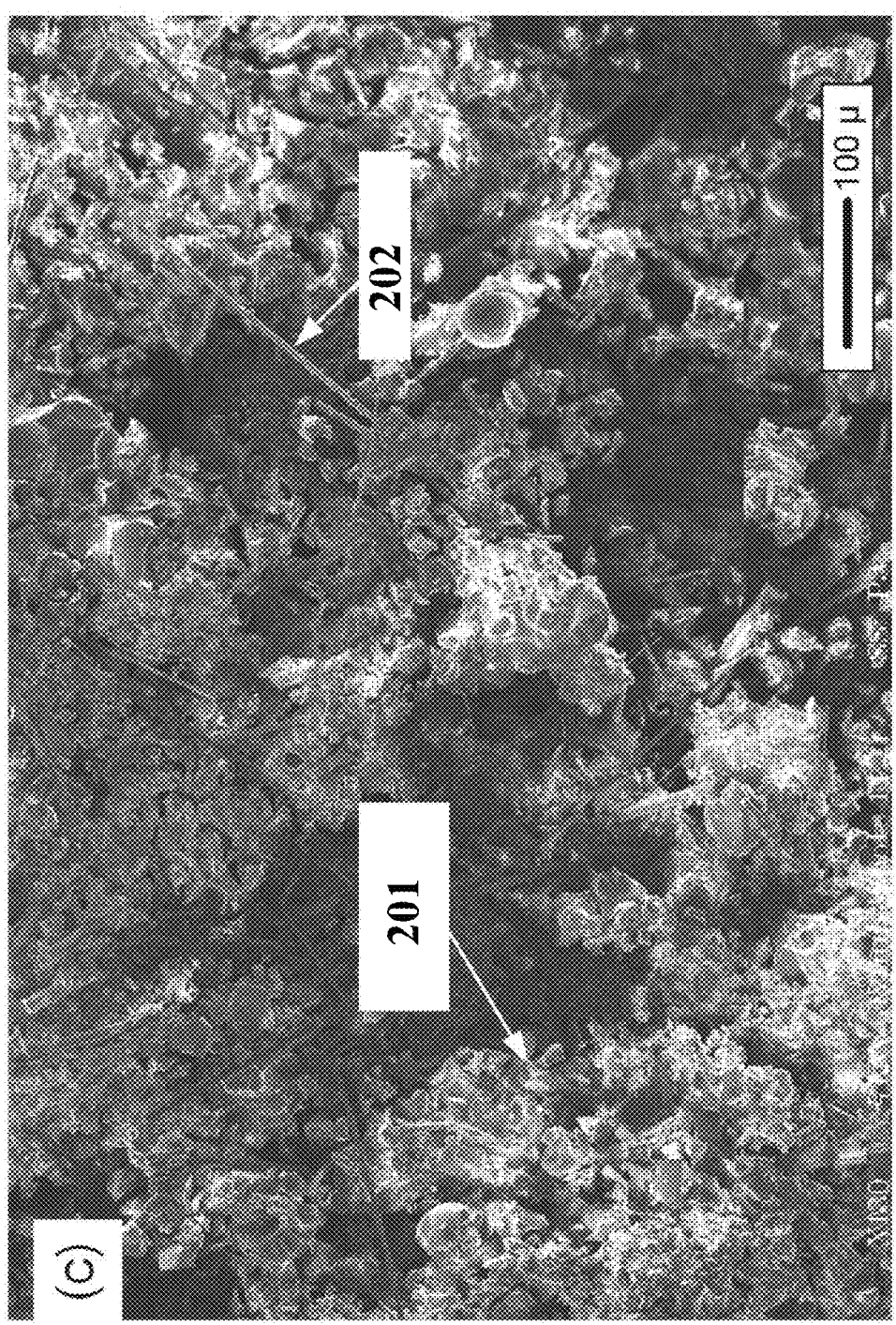
FIG. 2c is a photograph of a scanning electron microscope image of solid product for T90Q.

It was also found that most of AB product after reaction was confined in quartz wool layer for T90Q while the product for T90 without quartz wool expanded significantly. It is noted that as AB releases H$_2$ during thermolysis, the material expands (>10 times of original volume) along with foaming which inhibits retention of reaction heat. For T90Q, AB is integrated into the quartz wool layer during its melting followed by thermolysis reaction. See Aardahl C, Autrey T, Camaioni D, Dubois D, Linehan J, Karkamkar A, Rassat S, Zheng R, Shaw W, Li J, Heldebrant D, Potter R, Mock M, Luedtke A, Smurthwaite T. Chemical Hydrogen Storage Research at PNNL. Department of Energy Hydrogen Annual Progress Report 2009; and Zhao J Z, Shi J F, Zhang X W, Cheng F Y, Liang J, Tao Z L, Chen J. A Soft Hydrogen Storage Material: Poly(methyl acrylate)-Confined Ammonia Borane with Controllable Dehydrogenation. Adv Mater 2010; 22: 394-7. Thus, the quartz wool keeps the sample inside the layer and prevents further expansion which enables the integrated layer to retain reaction heat more effectively, as compared to the case without quartz wool. FIG. 2c shows a scanning electron microscopy image of solid product for T90Q.

Figures 3A, 3B, 3C:
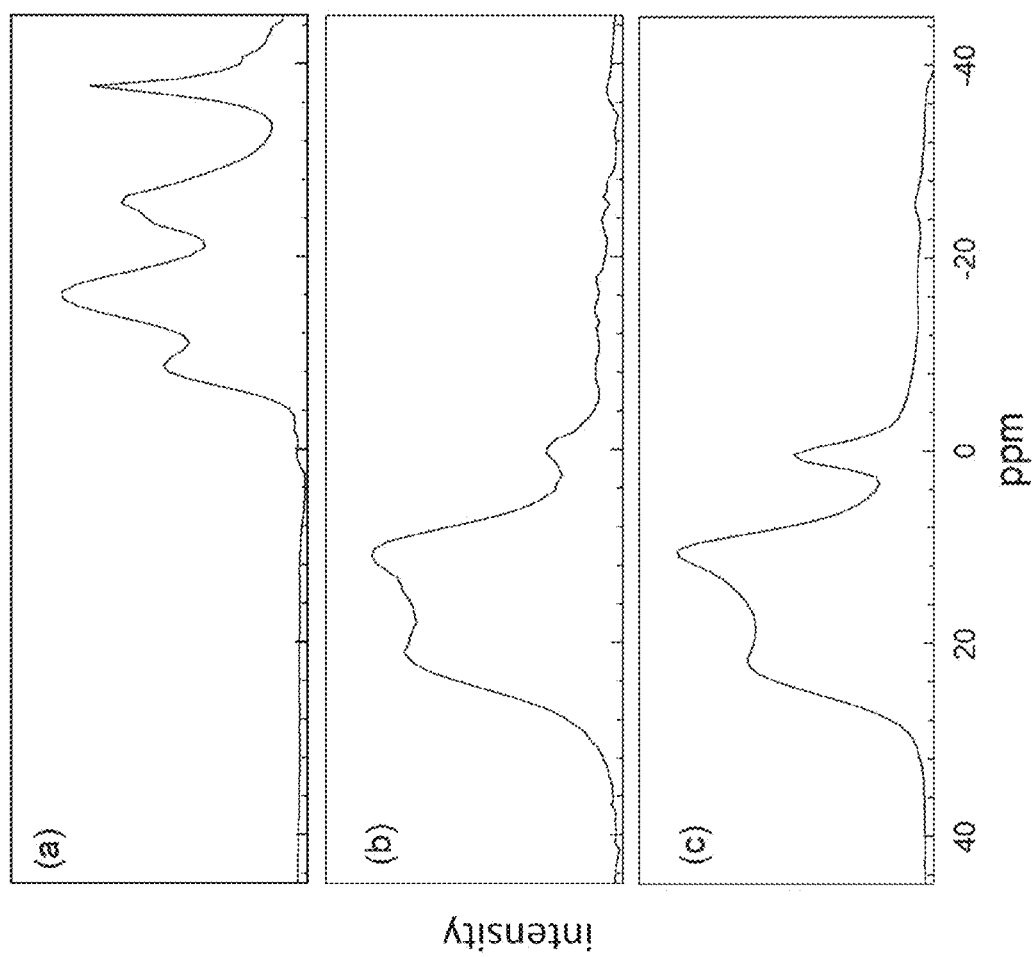
FIGS. 3a-3c are graphs of $^{11}B$ solid-state NMR spectrum, measured in intensity vs. chemical shift (ppm), of neat AB thermolysis product for (FIG. 3a) $T_{SP}$=90° C. without quartz wool (T90)

For AB dehydrogenation process to be successfully implemented, spent AB fuels must be economically regenerated to AB. For this reason, the solid products of AB dehydrogenation were characterized by solid-state $^{11}$B NMR. FIGS. 3a-3c are graphs of $^{11}$B solid-state NMR spectrum of neat AB thermolysis product for (FIG. 3a) $T_{SP}$=90° C. without quartz wool (T90); (FIG. 3b) $T_{SP}$=90° C. with quartz wool (T90Q); and (FIG. 3c) polyborazylene. The product of T90 shows several peaks over 0 to −40 ppm, corresponding to tetracoordinated boron atoms, i.e. (poly)-aminoborane, cyclotriborazane, etc., which result from AB thermolysis to about 1H$_2$ equivalent. See Heldebrant D J, Karkamkar A, Hess N J, Bowden M, Rassat S, Zheng F, Rappe K, Autrey T. The Effects of Chemical Additives on the Induction Phase in Solid-State Thermal Decomposition of Ammonia Borane. Chem Mater 2008; 20: 5332-6. On the other hand, the spectrum from the product of T900 clearly shows a different resonance feature between 0-40 ppm, as compared to those of the product after release of about 1H$_2$ equivalent. This resonance can be attributed to BN$_3$ or BN$_2$H in polyborazylene. See Xia G L, Yu X B, Guo Y H, Wu Z, Yang C Z, Liu H K, Dou S X. Amminelithium Amidoborane Li(NH$_3$)NH$_2$BH$_3$: A New Coordination Compound with Favorable Dehydrogenation Characteristics. Chem-Eur J 2010; 16: 3763-9; and Chua Y S, Wu G T, Xiong Z T, He T, Chen P. Calcium Amidoborane Ammoniate-Synthesis, Structure, and Hydrogen Storage Properties. Chem Mater 2009; 21: 4899-904. As shown in FIG. 3c, polyborazylene (97% pure, Boroscience Inc.) was also characterized and its spectrum is similar to that of the T90Q product (FIG. 3b). It is also noteworthy that significant progress towards regeneration of spent AB fuels obtained by AB thermolysis has been demonstrated in several laboratories. See Smythe N C, Gordon J C. Ammonia Borane as a Hydrogen Carrier: Dehydrogenation and Regeneration. Eur J Inorg Chem 2010: 509-21; Davis B L, Dixon D A, Garner E B, Gordon J C, Matus M H, Scott B, Stephens F H. Efficient Regeneration of Partially Spent Ammonia Borane Fuel. Angew Chem Int Edit 2009; 48: 6812-6; and Sutton A D, Burrell A K, Dixon D A, Garner E B, Gordon J C, Nakagawa T, Ott K C, Robinson P, Vasiliu M. Regeneration of Ammonia Borane Spent Fuel by Direct Reaction with Hydrazine and Liquid Ammonia. Science 2011; 331: 1426-9. Specifically, it has been recently reported that polyborazylene produced by AB thermolysis can be regenerated to AB with high yield. See Sutton A D, Burrell A K, Dixon D A, Garner E B, Gordon J C, Nakagawa T, Ott K C, Robinson P, Vasiliu M. Regeneration of Ammonia Borane Spent Fuel by Direct Reaction with Hydrazine and Liquid Ammonia. Science 2011; 331: 1426-9.

Figures 4A, 4B, 4C:
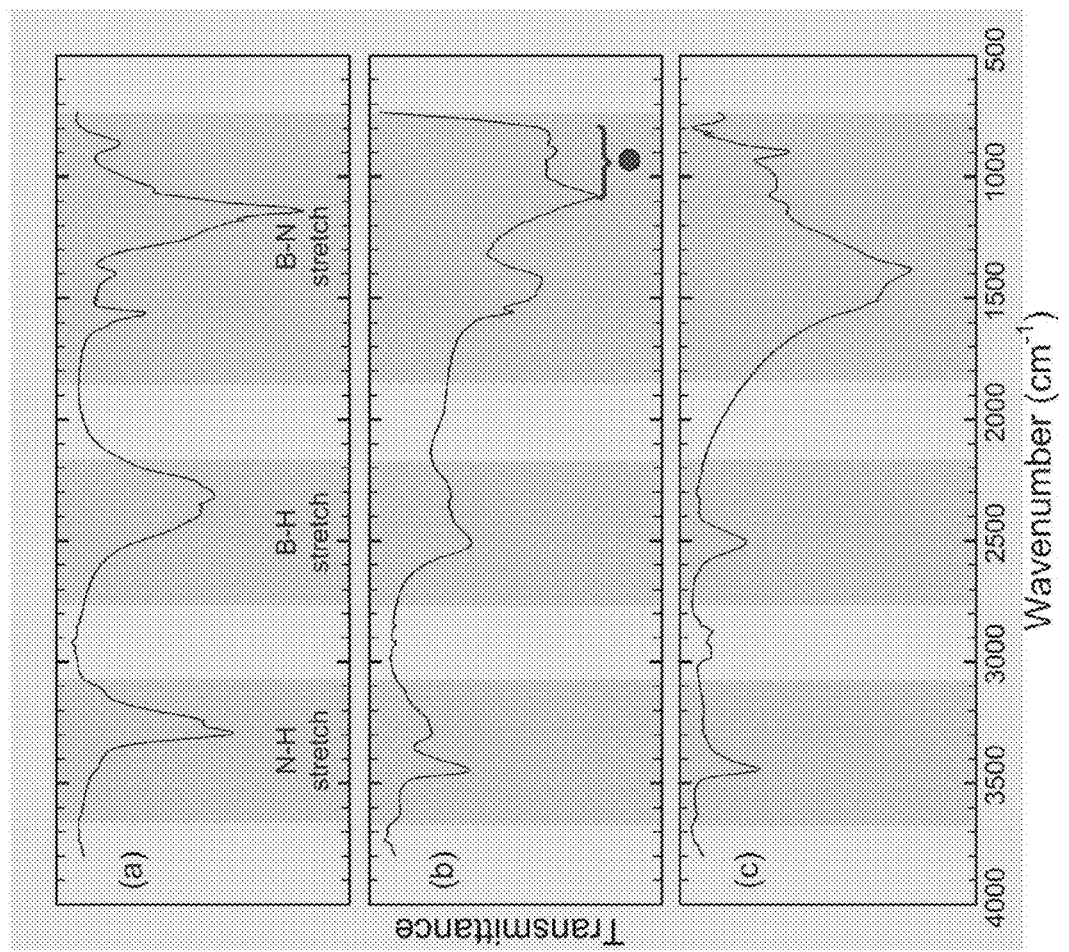
FIGS. 4a-4c are graphs of Fourier transform infrared spectra, measured in transmittance vs. wavenumber ($cm^{-1}$), of neat Ammonia borane (NH$_3$BH$_3$, AB) thermolysis product for (a) T$_{SP}$=90° C. without quartz wool (T90), (b) T$_{SP}$=90° C. with quartz wool (T900), and (c) polyborazylene, wherein the symbol ● denotes the band for quartz wool.

The spent AB solid products were also characterized by Fourier transform infrared spectroscopy, as shown in FIGS. 4a-4c. For T90 (FIG. 4a), characteristic N—H, B—H and B—N stretching modes of polyaminoborane were observed at 3300, 2380 and 860 cm$^{-1}$, respectively. In addition, peaks attributed to N—H and B—H deformation appear at 1570 and 1145 cm$^{-1}$, respectively. All the bands observed for T90 match well with those published previously. See Frueh S, Kellett R, Mallery C, Molter T, Willis W S, King'ondu C, Suib S L. Pyrolytic Decomposition of Ammonia Borane to Boron Nitride. Inorg Chem 2011; 50: 783-92; and Zhang J, Zhao Y, Akins D L, Lee J W. CO2-Enhanced Thermolytic H$_2$ Release from Ammonia Borane. The Journal of Physical Chemistry 2011; 115: 8386-92. For T90Q, the bands observed for T90 were reduced and shifted to lower wavenumbers. For these cases, N—H and B—H stretching modes were shifted to 3450 and 2500 cm$^{-1}$, respectively, as well as a broad B—N stretching between 1375 and 1525 cm$^{-1}$ exists. The spectrum obtained for polyborazylene (FIG. 3c) clearly shows that the new bands observed for T90Q can be assigned to polyborazylene-like species which result from release of about 2 hydrogen equivalent from AB. It is noted that the spectra observed between 800 and 1100 cm$^{-1}$ for T90Q can be ascribed to quartz wool added at the top of the AB sample. See Frueh S, Kellett R, Mallery C, Molter T, Willis W S, King'ondu C, Suib S L. Pyrolytic Decomposition of Ammonia Borane to Boron Nitride. Inorg Chem 2011; 50: 783-92; and Perdigon-Melon J A, Auroux A, Cornu D, Miele P, Toury B, Bonnetot B. Porous boron nitride supports obtained from molecular precursors. Influence of the precursor formulation and of the thermal treatment on the properties of the BN ceramic. J Organomet Chem 2002; 657: 98-106.

For use in PEM FCs, ammonia present in the H$_2$ stream is toxic to the fuel cell and needs to be removed. It has been reported that as low as 13 ppm NH$_3$ can decrease the fuel cell performance, and that the degradation is irreversible for long-term exposure (15 h) to 30 ppm NH$_3$. See Uribe F A, Gottesfeld S, Zawodzinski T A. Effect of Ammonia as Potential Fuel Impurity on Proton Exchange Membrane Fuel Cell Performance. J Electrochem Soc 2002; 149: A293-A6. Thus, it is important to quantify ammonia generation for the above-mentioned conditions. After cooling the reactor to room temperature at the end of the experiment, NH$_3$ was measured using Drager tube. For T90, 5-6 wt % H$_2$ yield was obtained for 2 hr hold at the set point, and 400-500 ppm of NH$_3$ in the product gas was detected. See Al-Kukhun A, Hwang H T, Varma A. A Comparison of Ammonia Borane Dehydrogenation Methods for Proton-Exchange-Membrane Fuel Cell Vehicles: Hydrogen Yield and Ammonia Formation and Its Removal. Ind. Eng. Chem. Res.: 10.1021/ie102157v. It is remarkable that under effective heat management (T900), NH$_3$ concentration in gaseous product was trace amount (<10 ppm), much less than that observed in neat AB thermolysis without heat management (T90).

Figure 5:
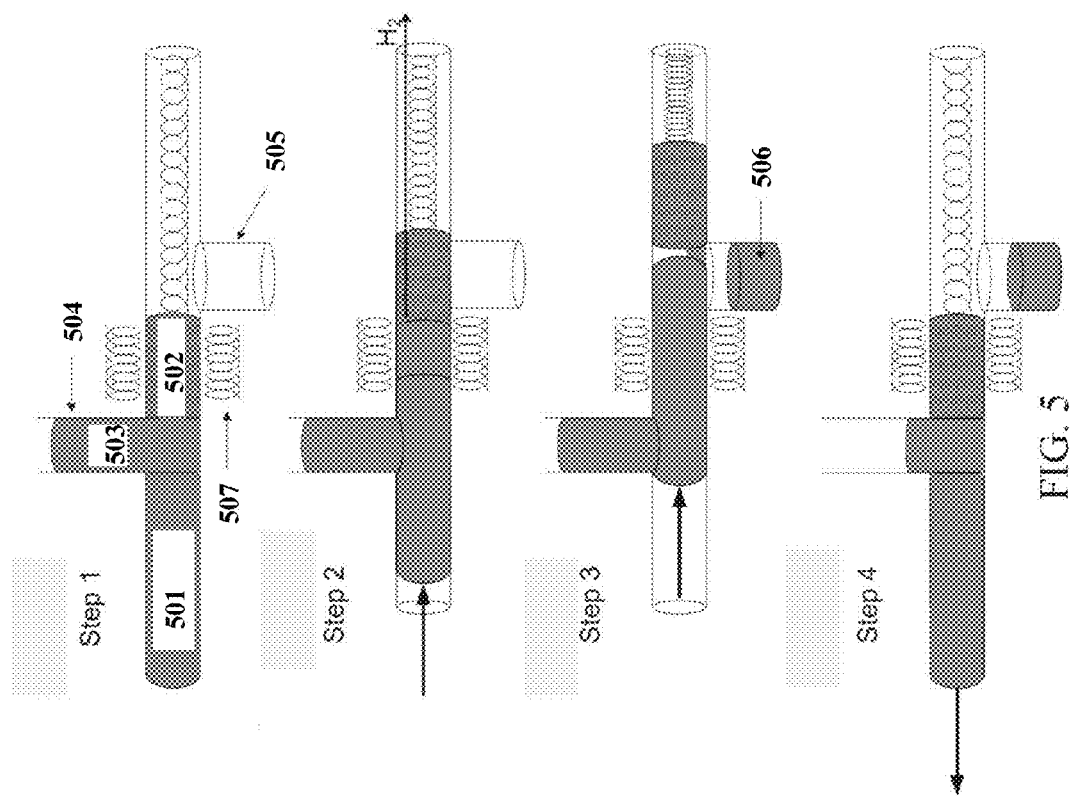
FIG. 5 is a schematic of a system for generating hydrogen, according to the present disclosure.

Referring to FIG. 5, a schematic for an exemplary embodiment of an on-board hydrogen generation system to be used with a fuel cell is depicted. The system includes two pistons slidably positioned within a cylinder. The first piston (501) includes a solid outer surface while the second piston (502) includes a perforated outer surface. The second piston (502) is coupled to the right end of the cylinder by a biasing member. The biasing member is configured to provide a leftward force to the second piston (502) as a rightward biasing force is applied to the first piston (501) and the force is thereby translated to the second piston (502) by the incompressibility of fluid and/or powder between the first piston (501) and the second piston (502). Initially the first piston (501) is in a left most position. At this position, minimal or zero biasing force is applied to the first piston (501) from the outside (left side of the piston). At the same time, the second piston (502) is positioned adjacent to the first piston (501) allowing a volume of fluid and/or powder to be present between the two pistons. The space between the pistons is in communication with an inlet identified as AB feeder (504). AB (503), as incoming source of hydrogen, is fed into the system through the AB feeder (504) and thereby occupies the volume between the two pistons. In addition to AB (503), quartz wool is also fed into the space between the first piston (501) and the second piston (502). The quartz wool can be provided through the same inlet (i.e., AB feeder (504)) or through another inlet (not shown). Therefore, when the pistons are in the left most position, the volume between the two pistons includes a composition of AB (503) and quartz wool.

As a biasing force is applied to the left side of the first piston (501), the two pistons begin to move rightward (as depicted in FIG. 5) until the volume between the two piston is aligned with a heat exchanger (507). The reaction zone is heated by waste heat from PEM fuel cell, which is generally operated at about 85° C., as depicted in FIG. 5. As heat is applied, hydrogen is generated and released through the perforations of the second piston (502). After the reaction is completed, the biasing force is applied to the left piston further forcing and moving the two pistons to the right. With production and release of hydrogen, the first piston (501) is allowed to move closer to the second piston (502) until the reduced volume between the two pistons is aligned with an outlet configured to eject/remove spent AB (506) into a spent AB reservoir (505). At this point the biasing force on the first piston (501) is removed resulting in a force in an opposite direction. The change in the direction of the force can be the result of a biasing force generated by a biasing member (not shown) positioned between the first piston (501) and the second piston (502), or as a result of a reversal of the biasing force that is applied to the first piston (501).

The released hydrogen can be used to feed the fuel cell in the vehicle to generate electrical energy for driving a motor used for propulsion.

Figure 6:
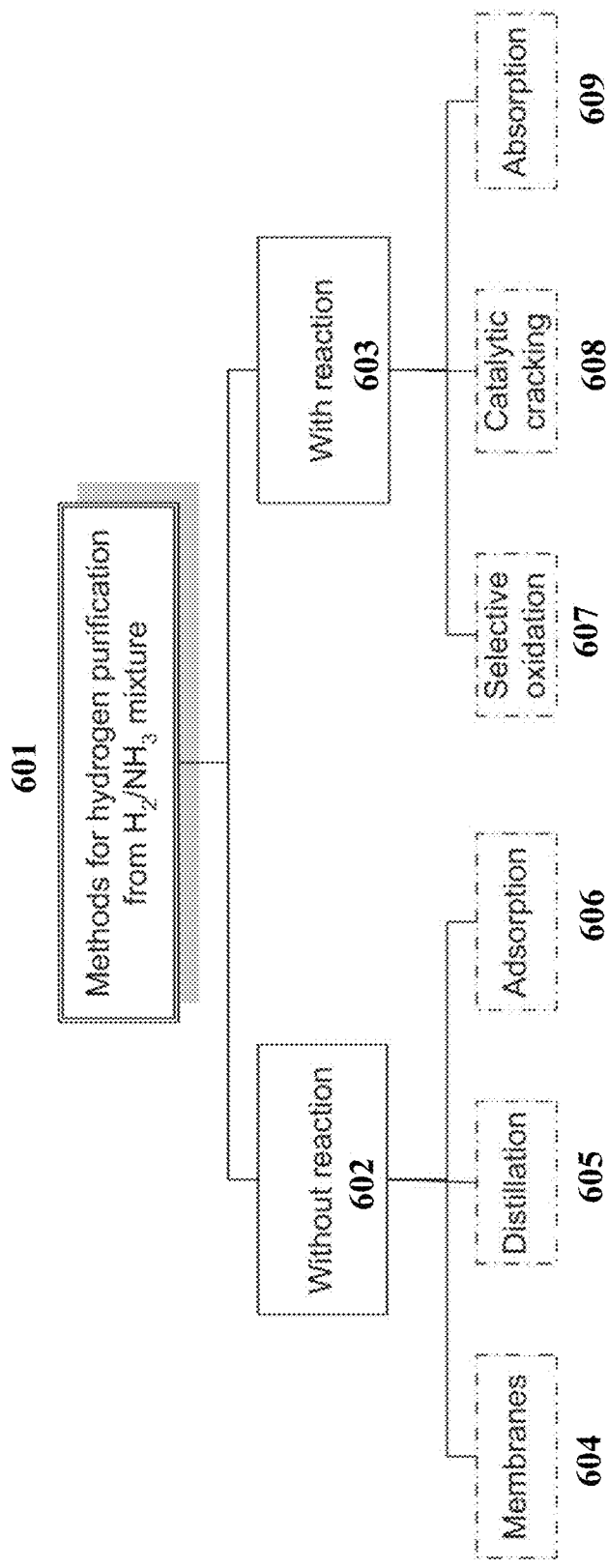
FIG. 6 depicts a flowchart of various methods of purifying hydrogen (H$_2$) from a mixture of hydrogen-ammonia (H$_2$/NH$_3$), according to the present disclosure.

Additionally, a novel method of purifying hydrogen from a hydrogen-ammonia mixture, which is an intermediate product of most hydrogen generation processes, has been developed. In particular, a method for removing ammonia ($NH_3$) from a dehydrogenation process (generally described as proton exchange membrane, PEM) of ammonia borane (AB, $NH_3BH_3$, e.g., 19.6 wt % $H_2$) that can be used in fuel-cell based vehicles is disclosed. Various approaches have been developed to separate ammonia from a gas mixture (FIG. 6., 601). The methods can be divided into two categories, depending on whether or not chemical reactions are involved. As shown in FIG. 6, some methods involve reactions (603) such as selective oxidation (607), catalytic cracking (608) or absorption in water (609), while other methods including adsorption (606), distillation (605) or membrane separation (604) involve a physical basis (602). Most of these methods, however, have their drawbacks when separating ammonia.

For instance, selective oxidation (607) requires a relatively high temperature (200-400° C.) and causes safety concerns due to the flammable mixtures of hydrogen and oxidant. See Lippits, M. J.; Gluhoi, A. C.; Nieuwenhuys, B. E., A comparative study of the selective oxidation of NH3 to N-2 over gold, silver and copper catalysts and the effect of addition of Li20 and CeOx. Catalysis Today 2008, 137, (2-4), 446-452; Cui, X. Z.; Zhou, J.; Ye, Z. Q.; Chen, H. R.; Li, L.; Ruan, M. L.; Shi, J. L., Selective catalytic oxidation of ammonia to nitrogen over mesoporous CuO/Ru02 synthesized by co-nanocasting-replication method. *Journal of Catalysis* 2010, 270, (2), 310-317; and Sazonova, N. N.; Simakov, A. V.; Nikoro, T. A.; Barannik, G. B.; Lyakhova, V. F.; Zheivot, V. I.; Ismagilov, Z. R.; Veringa, H., Selective catalytic oxidation of ammonia to nitrogen. Reaction Kinetics and Catalysis Letters 1996, 57, (1), 71-79. Similar to selective oxidation (607), catalytic cracking (608) also requires a relatively high temperature which is difficult to obtain on-board vehicles unless some hydrogen is sacrificed in a burner. See Pelka, R.; Moszynska, I.; Arabczyk, W., Catalytic Ammonia Decomposition Over Fe/Fe4N. *Catalysis Letters* 2009, 128, (1-2), 72-76; Choudhary, T. V.; Sivadinarayana, C.; Goodman, D. W., Catalytic ammonia decomposition: COx-free hydrogen production for fuel cell applications. *Catalysis Letters* 2001, 72, (3-4), 197-201; Liang, C. H.; Li, W. Z.; Wei, Z. B.; Xin, Q.; Li, C., Catalytic decomposition of ammonia over nitrided MoNx/alpha-Al2O3 and NiMoNy/alpha-Al2O3 catalysts. *Industrial & Engineering Chemistry Research* 2000, 39, (10), 3694-3697; and Sorensen, R. Z.; Nielsen, L. J. E.; Jensen, S.; Hansen, O.; Johannessen, T.; Quaade, U.; Christensen, C. H., Catalytic ammonia decomposition: miniaturized production of COx-free hydrogen for fuel cells. *Catalysis Communications* 2005, 6, (3), 229-232. While adsorption (606) methods allow for high selectivity and ability to remove ammonia completely, there is relatively low capacity (<5 wt % $NH_3$). Distillation (605) methods are energy intensive and require cooling duties that make this approach impractical for PEM fuel cell vehicles. Further, methods utilizing membranes (604), while common, certain types may be poisoned by $NH_3$, require high temperatures, or have low selectivity. See Richard, V.; Favre, E.; Tondeur, D.; Nijmeijer, A., Experimental study of hydrogen, carbon dioxide and nitrogen permeation through a microporous silica membrane. *Chemical Engineering Journal* 2001, 84, (3), 593-598; Varma, A.; Yeung, K. L.; Souleimanova, R. S.; Mukasyan, A. S., Novel approach for thin dense nanoscale-grained metal films. *Industrial & Engineering Chemistry Research* 2002, 41, (25), 6323-6325; and Sakamoto, F.; Kinari, Y.; Chen, F. L.; Sakamoto, Y., Hydrogen permeation through palladium alloy membranes in mixture gases of 10% nitrogen and ammonia in the hydrogen. *International Journal of Hydrogen Energy* 1997, 22, (4), 369-375.

With regards to the absorption (609) method, water ($H_2O$) and alcohols are known to be good solvents for absorbing ammonia, where water has higher $NH_3$ solubility (52 g $NH_3$/100 g $H_2O$ at 20° C.). In addition, water is readily available in a fuel cell system (as the main products of the fuel cell system are electricity and water). Since $H_2$ has low solubility in water (0.16 g $H_2$/100 g $H_2O$ at 20° C.), the absorption of ammonia by water has superior selectivity and can be used for hydrogen purification. Further, ammonia absorption by water is already used in industry, but the difficulty of this approach for vehicle applications is the incomplete removal of $NH_3$ to ppm level requirements discussed in the background section of the present disclosure. See Shreve, R. N.; Austin, G. T., *Shreve's Chemical process industries* 5th ed.; McGraw-Hill: 1984; p 307-309.

Accordingly, two AB dehydrogenation methods are of particular interest. The AB hydrothermolysis provides the highest $H_2$ yield at the lowest operating temperature, but AB conversion to $NH_3$ is also higher as compared to the other methods. On the other hand, AB/bmimCl with 3 wt % moisture provides high $H_2$ yield with low ammonia formation, but reduction in the operating temperature is needed in order to utilize waste heat from the PEM FC.

Based on the work described in this disclosure, out of various $H_2$ purification methods, either absorption or adsorption have been found to be effective. For the various AB dehydrogenation methods investigated in this work, adsorption alone is sufficient to provide less than 0.1 ppm $NH_3$ in the exit gas. Accounting for the worst case scenario for $NH_3$ formation, however, a sequence of absorption in water and adsorption on impregnated carbon can be shown to capture the ammonia effectively from the product gas stream. In this case, the majority of ammonia is absorbed in water (which can be recycled from PEM FC), while the remaining exiting the absorber is removed by the adsorbent. Optimization results show that the weight required for the $NH_3$ removal system can be significantly reduced if water is recycled from the PEM FC. Further, since borazine hydrolyzes readily in water, the method/system according to the present disclosure not only removes ammonia but also purifies the hydrogen stream from any volatile borazine present. Thus, with high hydrogen yield and effective method to remove impurities, AB dehydrogenation provides an advantageous approach to generate hydrogen for PEM FC vehicle applications.

Adsorption of ammonia using materials such as activated carbon, mesoporus carbon and zeolites is known. See Rodrigues, C. C.; de Moraes, D.; da Nobrega, S. W.; Barboza, M. G., Ammonia adsorption in a fixed bed of activated carbon. *Bioresource Technology* 2007, 98, (4), 886-891; Mangun, C. L.; Braatz, R. D.; Economy, J.; Hall, A. J., Fixed bed adsorption of acetone and ammonia onto oxidized activated carbon fibers. *Industrial & Engineering Chemistry Research* 1999, 38, (9), 3499-3504; and Roque-Malherbe, R.; Marquez-Linares, F.; Del Valle, W.; Thommes, M., Ammonia Adsorption on Nanostructured Silica Materials for Hydrogen Storage and Other Applications. *Journal of Nanoscience and Nanotechnology* 2008, 8, (11), 5993-6002. The main advantages of using adsorbents are their high selectivity and ability to remove ammonia completely, allowing the use of hydrogen from AB for PEM FCs without loss of performance. See John, S.; Carmen, Y., Adsorption, Gas Separation. In *Kirk-Othmer Encyclopedia of Chemical Technology*, 4th ed.; Watcher, Ed. John Wiley & Sons Inc.: New York, 2001; Vol. 1, p 282. In addition, adsorbents can be easily regenerated by heating. However, one drawback of this method is relatively low capacity (<5 wt % $NH_3$).

Figure 7:
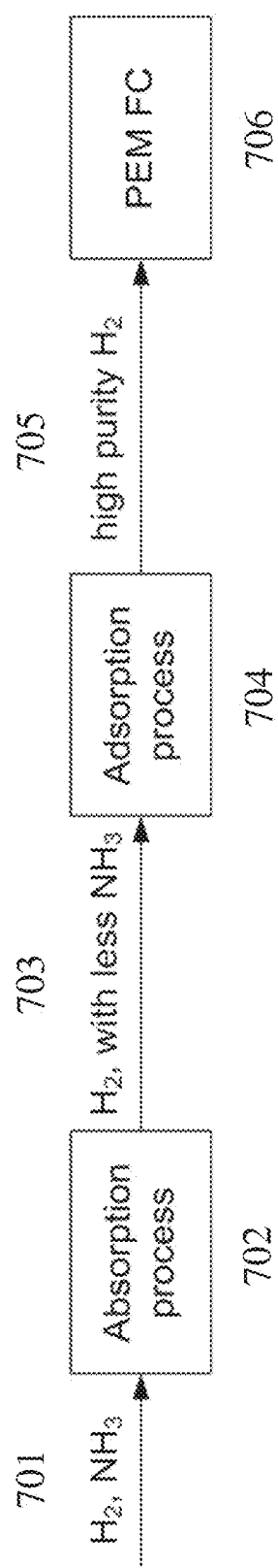
FIG. 7 depicts a flow chart of absorption-adsorption of NH$_3$, according to the present disclosure.

From the PEM FC vehicle viewpoint (706), the $H_2$ purification method should account for (1) operating temperature, (2) safety, and (3) complete $NH_3$ removal. Water provides a high capacity to absorb ammonia while adsorbent can be used to remove $NH_3$ completely. Thus, a combination of the two methods can capture the ammonia effectively from the product gas stream (701) by a sequence of absorption (702) to generate a composition of hydrogen with smaller amounts of $NH_3$ (703) and then followed by adsorption (704), which has a high purity of $H_2$ (705), see FIG. 7.

Figure 8:
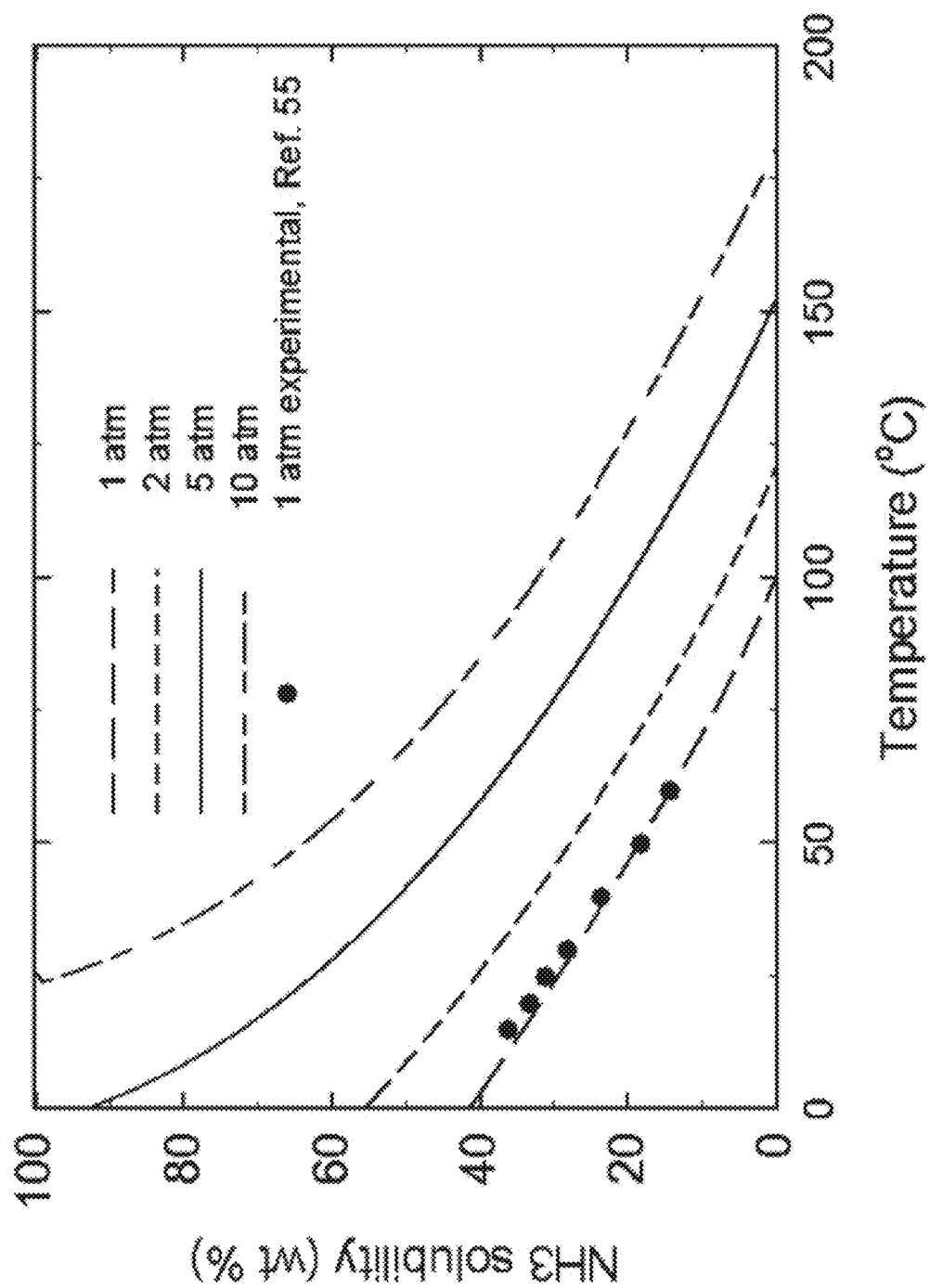
FIG. 8 depicts a plot of NH$_3$ solubility (in percent by weight) vs. temperature (in degrees Celsius).

The $NH_3$ removal by absorption in water was simulated using ASPEN PLUS simulation package software, along with the ELECNRTL (electrolyte-NRTL) model and Redlich-Kwong equation of state for thermodynamic properties. As shown in FIG. 8, ammonia solubility increases with increasing pressure and decreases with increasing water temperature. Further, the simulation results fit well with the experimental data obtained by other researchers. See Czuppon, T. A.; Kenz, S. A.; Rovner, J. M., Ammonia. In *Kirk-Othmer Encyclopedia of Chemical Technology*, 4th ed.; Watcher, Ed. John Wiley & Sons Inc.: New York, 2001; Vol. 2, p 335.

The $NH_3$ absorption process was simulated for a three-stage column, with the feed stream containing $H_2$ and $NH_3$ introduced into the absorber, and water flowing countercurrently. The hydrogen flow rate was fixed at 17 g/min, corresponding to 5.8 kg $H_2$ required for 350 mile drive, with 50% fuel cell efficiency, and 60 mph speed. The ammonia concentration of the feed stream was also fixed at 5 mol %, which corresponds to a case for the hydrothermolysis process ~60 wt % AB providing ~11 wt % $H_2$ yield.

Figure 9:
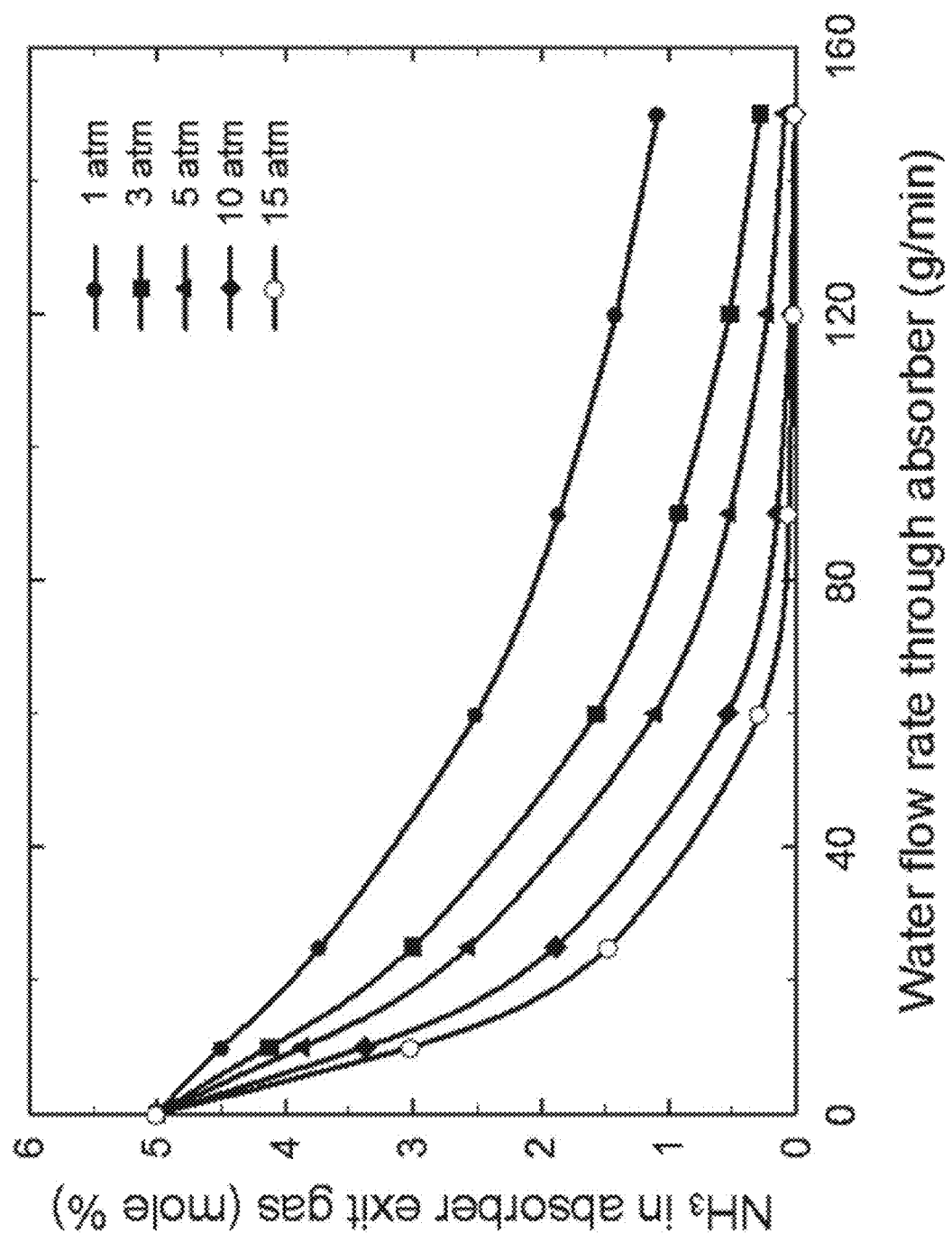
FIG. 9 depicts a plot of NH$_3$ present in absorber exit gas measure in (mole %) vs. water flow rate through absorber measured in g/min.

The composition of the $H_2$-rich gas exiting the absorber was calculated for the operating conditions summarized in Table 2. FIG. 9 shows simulation results for $NH_3$ composition in the exit gas stream from the absorption column. The results show that $H_2$ purity increases with increasing water flow rate and column operating pressure.

TABLE 2

| Operating conditions for the $NH_3$ absorption process | |
|---|---|
| Parameter | Values |
| inlet gas flow rate (mol/min) | 8.88 |
| inlet water flow rate (g/min) | 10-150 |
| inlet gas temperature (° C.) | 25 |
| inlet water temperature (° C.) | 25 |
| column pressure (atm) | 1-15 |
| inlet gas composition (mol %) | 95% $H_2$, 5% $NH_3$ |

Figure 10:
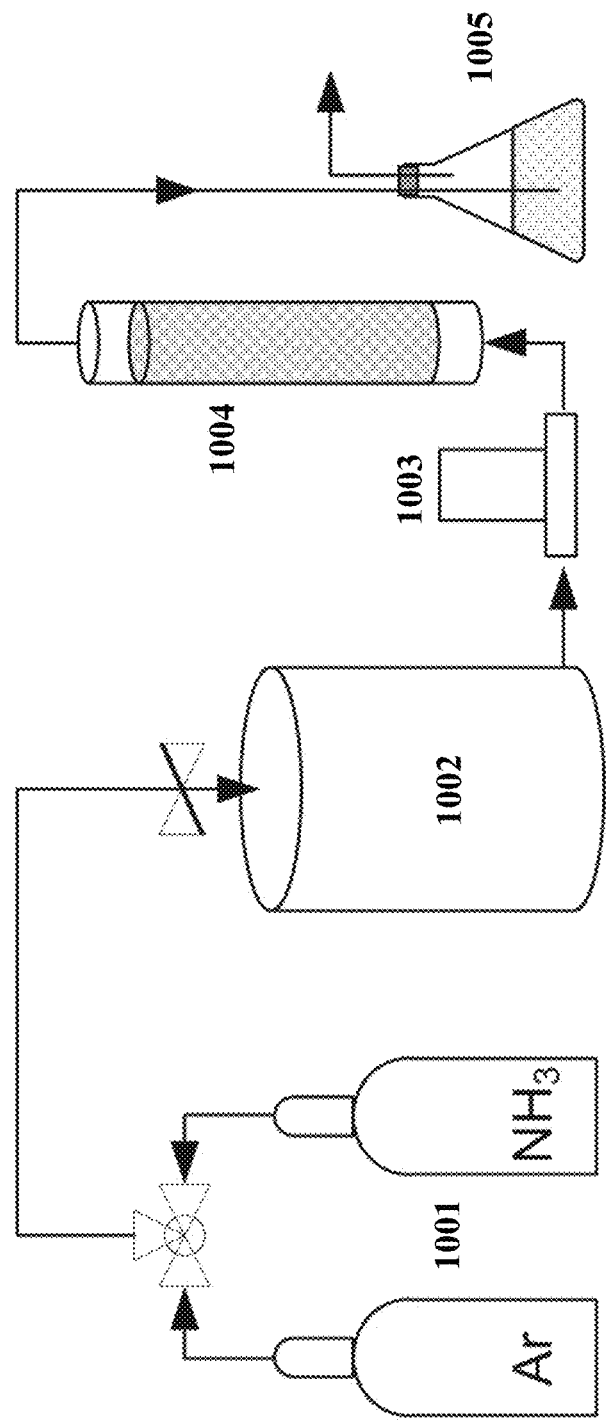
FIG. 10 depicts a proof-of-concept schematic for adsorption aspect of the present disclosure.

The adsorption of $NH_3$ was studied on a commercial impregnated carbon, and a flow method was used to determine the adsorption capacity. FIG. 10 shows a schematic diagram of the apparatus containing gas cylinder(s) (1001), mixed gas chamber (1002), mass flow controller (1003), adsorption column (1004), and flask with $CuSo_4$ (1005). The mixed gas (1001, 1002) was introduced into the column (1003, 1004) until $NH_3$ was detected in the $CuSO_4$ solution (1005), and the experiment was then terminated. The adsorption capacity, 5.0-5.7 wt % $NH_3$, was determined by the adsorbent weight difference before and after adsorption.

Figure 11A:
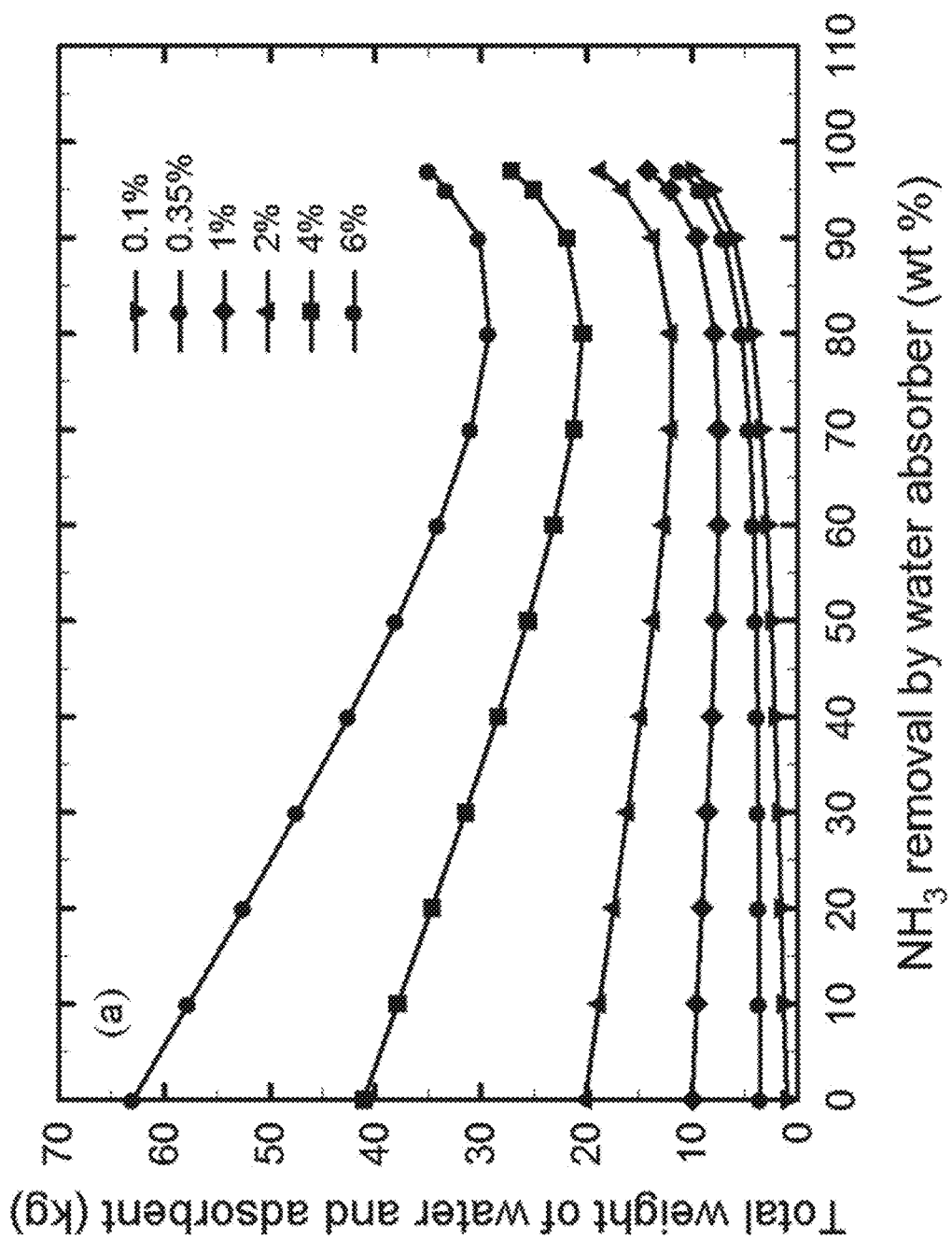
FIG. 11a depicts a plot of total weight of water and adsorbent measure in kilogram (kg) vs. NH$_3$ removal efficiency by water absorber measured in percent weight for various NH$_3$ concentrations at 10 atmosphere (atm).

The adsorbent is effective for removing low concentrations of ammonia but has relatively low capacity. On the other hand, the combined method (absorption, followed by adsorption) can remove ammonia effectively even when the concentration of $NH_3$ is high. In this context, it is important to calculate criteria of $NH_3$ concentration to select the best method, i.e. adsorption only or combination of absorption and adsorption. For this reason, the total weight requirement for $NH_3$ removal was calculated for various $NH_3$ concentrations at 10 atm pressure, and the results are shown in FIG. 11*a*, where the weight requirements are presented for different fractions of $NH_3$ removed by the absorber ($X_{ab}$). The calculations were made where 5.8 kg $H_2$ is required for a 350-mile drive, with 50% fuel cell efficiency.

The $NH_3$ concentrations in FIG. 11*a* are representative of product gas from the different AB dehydrogenation methods. It may be seen that for low ammonia concentration (<2%) only adsorption is required, while for higher concentrations a combination of absorption and adsorption is needed, where the majority of ammonia is absorbed in water and the remainder by the adsorbent. From the application viewpoint, all the AB dehydrogenation methods studied in this work need only adsorbent at the maximum hydrogen yield conditions because ammonia concentration is always <2%.

As discussed above, owing to the highest $H_2$ yield obtained at PEM FC operating temperatures (i.e., <90° C.), AB hydrothermolysis process provides significant advantages. However, it also leads to higher $NH_3$ formation as compared to the other methods. The maximum $H_2$ yield of 13.5 wt % was obtained using AB hydrothermolysis at 85° C. and 79 wt % AB with 1 mol % $NH_3$ in the product gas. $NH_3$ concentration in that region in the gas phase is sharply sensitive to AB wt %. For this reason, the total required weight of materials (water and adsorbent) for complete $NH_3$ removal by the combination method (adsorption, followed by the adsorption) was calculated for 5 mol % $NH_3$ in $H_2$ as the worst case scenario. As noted above, this value corresponds to ~60 wt % AB providing ~11 wt % $H_2$ yield.

Figure 11B:
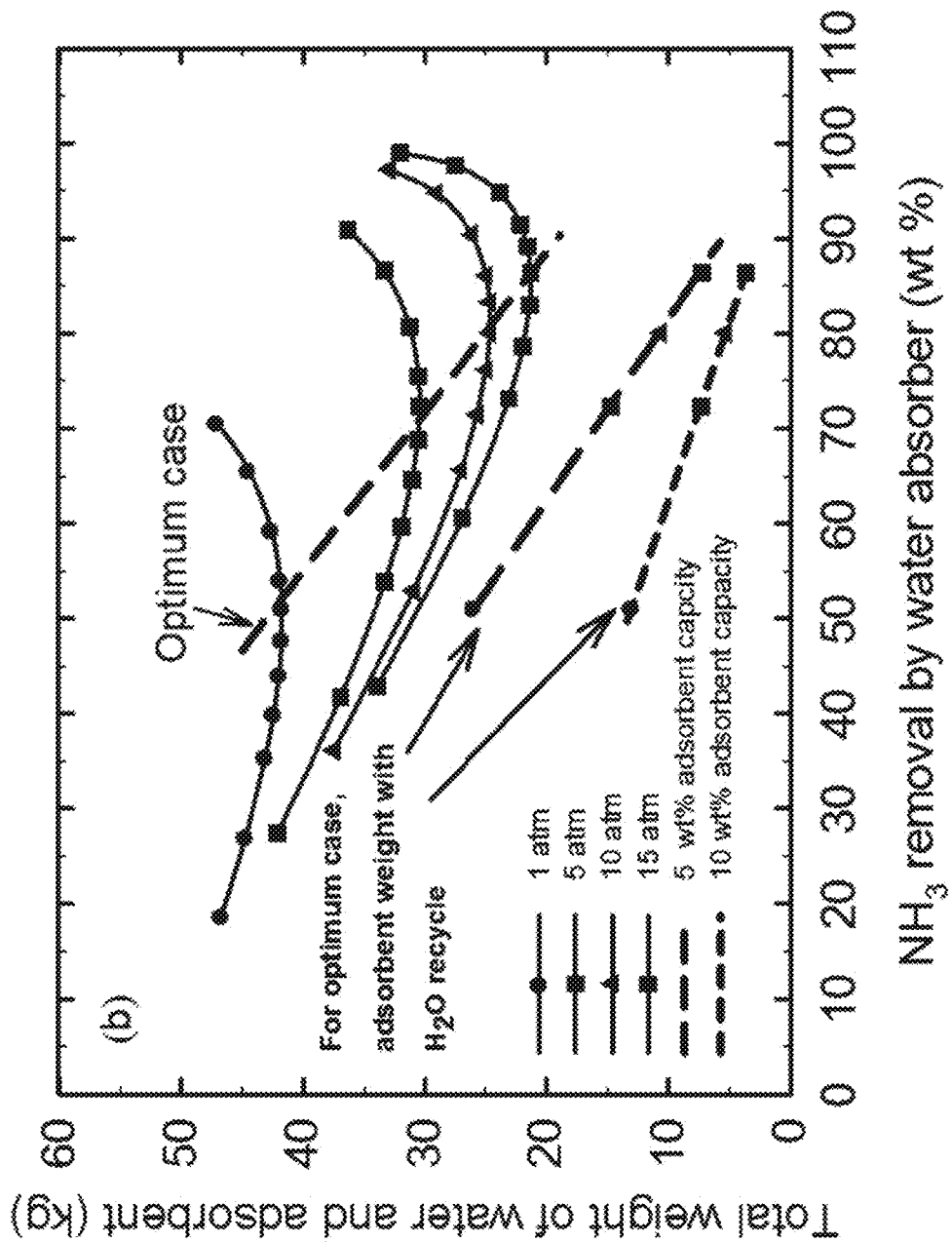
FIG. 11b depicts a plot of total weight of water and adsorbent measure in kilogram (kg) vs. NH$_3$ removal efficiency by water absorber measured in percent weight at different pressures for 5 mol % NH$_3$ in H$_2$ feed.

The results for various pressures are shown in FIG. 11b, where the total weight requirements are presented for different fractions of $NH_3$ removed by the absorber ($X_{ab}$). For example, assuming that 60% of total $NH_3$ is removed in the water absorber at 1 atm, a total weight of 42.6 kg (21 kg water and 21.6 kg adsorbent) is required to remove $NH_3$ completely. FIG. 11b also shows that an optimum $X_{ab}$ value exists for each pressure, which increases with increasing pressure.

The total required weight decreases with increasing pressure. For example, the minimum weight requirement for 1 atm is 41.7 kg at 51% $X_{ab}$, while only 21.3 kg is required for 15 atm at 86% $X_{ab}$. Thus, the weight required for $NH_3$ removal can be substantially reduced by process optimization. In addition, recycling of some water that is generated in the fuel cell system (total 52.2 kg $H_2O$ from 5.8 kg $H_2$) will decrease the $NH_3$ removal weight requirements significantly. For example, at 1 atm the 41.7 kg required drops to 25.9 kg, while for 15 atm the 21.3 kg to 7.3 kg. Further, it was recently reported that ~10 wt % $NH_3$ adsorption capacity can be achieved using mesoporous carbon with rapid adsorption kinetics. See Saha, D.; Deng, S. G., Adsorption equilibrium and kinetics of CO2, CH4, N2O, and NH3 on ordered mesoporous carbon. *J Colloid Interf Sci* 2010, 345, (2), 402-409. Using this capacity value, the weight requirements for $NH_3$ removal decrease by a factor of 2, i.e. for 1 atm the 25.9 kg drops to 12.45 kg, and for 15 atm the 7.3 kg to 3.65 kg with water recycle from the PEM FC system. The latter value corresponds to only 7% of the total AB-water weight (~51 kg) required to generate 5.8 kg $H_2$ (350 miles drive with 50% fuel cell efficiency) with $H_2$ yield (11.4 wt %) by the hydrothermolysis process at 60 wt % AB.

In terms of total gravimetric requirements, the AB+additive (i.e. water, bmimCl, PS, nano-BN) weight required to generate 5.8 kg $H_2$ (350 miles drive with 50% fuel cell efficiency) from maximum $H_2$ yield corresponding to each method. The hydrothermolysis process requires total weight ~53 kg including AB-$H_2O$ mixture as fuel and adsorbent for $NH_3$ removal. This value drops to ~44 kg, when water in the AB-water mixture is recycled from the fuel cell. As compared to gasoline internal combustion engines, assuming 25 mpg, the mass of gasoline required to drive 350 miles is ~39 kg. This value is close to that estimated for the AB hydrothermolysis system.

Figure 12:
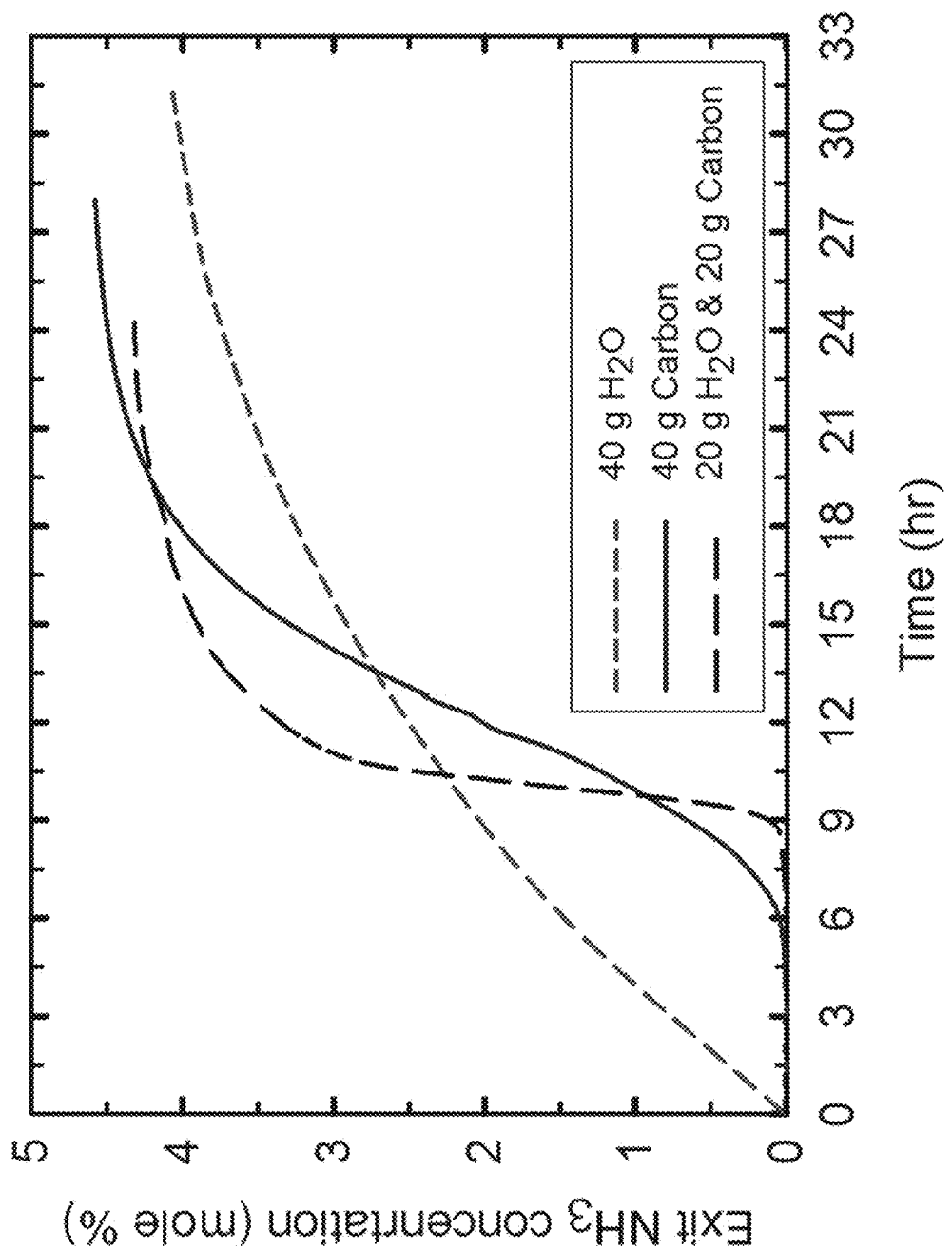
FIG. 12 is a plot of exit ammonia gas concentration measured in mole % vs. time measured in hours at 1 atm and 25° C. and feed concentration of 4.6 mol % NH$_3$ in argon.

FIG. 12 shows the ammonia concentration vs. time in the exit gas stream for three configurations which include absorption in 40 g water, adsorption using 40 g impregnated carbon, and absorption in 20 g water followed by adsorption using 20 g impregnated carbon. It can be clearly seen that water has high capacity for ammonia and takes long time to saturate, but the ammonia concentration in the exit stream remains >100 ppm right from the beginning. On the other hand, impregnated carbon shows excellent performance in removing ammonia completely ($NH_3$ concentration <0.1 ppm for ~3.75 hours). Finally, a combination of absorption and adsorption shows even better ammonia removal efficiency ($NH_3$ concentration <0.1 ppm for ~6.5 hours). The results indicate that in this case, the majority of ammonia was absorbed in water, while the remaining was adsorbed. Thus, the absorption-adsorption combination allows the $NH_3$ removal method to remain effective for longer time period before the exit $NH_3$ concentration becomes >0.1 ppm. The $NH_3$ amount absorbed in water increases with increasing the operating pressure, resulting in better performance than obtained at 1 atm.

In a recent report, studies to remove impurities, such as borazine and ammonia, generated during AB dehydrogenation were presented. See Mohajeri, N.; T-Raissi, A.; Ramasamy, K.; Adebiyi, O.; Bokerman, G. *Ammonia-Borane Complex for Hydrogen Storage*; NASA technical reports server-NTRS: 2009, Document ID: 20090021340. The purification system of the prior art consisted of two traps, one for ammonia (catalytic cracking above 400° C.) and the other for borazine (sorbents). However, no additional systems/steps are needed in the system/method, according to the present disclosure for purifying hydrogen, since borazine is readily hydrolyzed in water to generate hydrogen and ammonia, (see Table 3, Eq. 6 below), which is removed by the currently proposed purification system. See Dhawan, P., *Inorganic Chemistry*. Mc-Graw-Hill: 2007; p 8.8; and Lewis, R., *Hawley's Condensed Chemical Dictionary*. 12 ed.; Van Nostrand Reinhold Co: New York, 1993; p 162.

TABLE 3

| Borazine hydrolysis |
| --- |
| $N_3B_3H_6 + 9H_2O \rightarrow 3NH_3 + 3B(OH)_3 + 3H_2$     (6) |

Thus, in addition to removing ammonia, the system/method according to the present disclosure can remove volatile borazine present in the $H_2$ stream and simplifies the purification technique.

Figure 13:
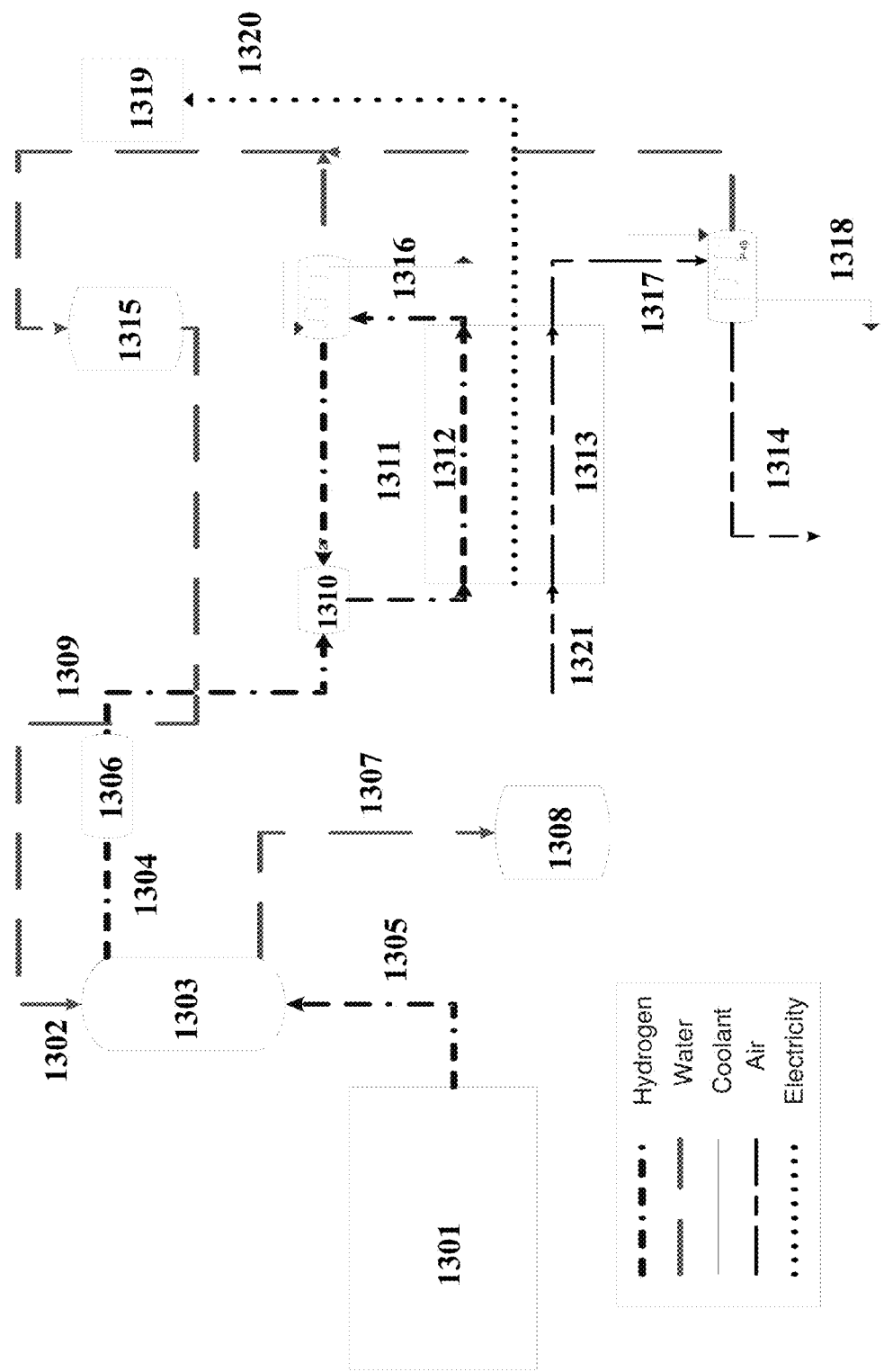
FIG. 13 is a schematic of an exemplary embodiment of an absorption-adsorption NH$_3$ removal scheme according to the present disclosure.

Referring to FIG. 13, a schematic of an exemplary system for purifying $H_2$ that can be combined with various hydrogen generation processes is depicted. The system depicted in FIG. 13 can be used as an inline hydrogen purification system within a vehicle that uses a fuel cell for energy generation. As indicated, the system of FIG. 13 can be used with any system that generates $H_2$ with some ammonia (1301). The mixture of $H_2$ and $NH_3$ (1305) is provided to an absorption column (1303) where water is added (1302) to absorb ammonia from the mixture. The absorption column (1303) includes two inlets, (i.e., 1) the $H_2$—$NH_3$ mixture (1305), and 2) water for absorption (1302)) and two outlets (i.e., 1) $H_2O$—$NH_3$ (1307, 1308) and 2) $H_2$—$NH_3$, where $H_2O$—$NH_3$ is absorbed ammonia in water and $H_2$—$NH_3$ is a mixture of $H_2$ with low amounts of $NH_3$ present (1304)). The $H_2O$—$NH_3$ (i.e., absorbed ammonia in water) (1307) is then provided to a contaminated water tank (1308) which includes ammonia for later-processing. The H$_2$—NH$_3$ (1304) is then provided to an adsorbent (1306) (e.g., a carbon filtration device) for adsorbing essentially the remainder of NH$_3$ present in H$_2$—NH$_3$. The outlet of the adsorbent (1306) is a purified H$_2$ (1309) with only traces of ammonia (e.g., less than 1 ppm). The highly purified H$_2$ (1309) is then provided to a buffer (1310) for use in the vehicle. A pump (not shown) can be used to pressurize the purified H$_2$ in a reservoir (not shown). In one embodiment, the combination of the reservoir (not shown) and the pump (not shown) is the buffer.

As indicated in FIG. 13, the purified H$_2$ (1309) is provided to an anode (1312) of the fuel cell (1311) wherein a reaction takes place with oxygen (O$_2$) from air (1321) that is provided at a cathode (1313). The result of the reaction is electrical energy (1320) and water. The electrical energy (1320) is provided to a motor (1319) to be used as a source of propulsion of the vehicle. The water that is produced as a result of the reaction is in the form of water vapor in unreacted H$_2$ (identified as humid H$_2$) (1316), and unreacted air (identified as wet air) (1317). Each of humid H$_2$ (1316) and wet air (1317) is provided at an inlet of a condenser supplied with a coolant (1318) and/or a heat exchanger to condense out the water in the associated composition of the fluid provided at the inlet.

The humid H$_2$ (1316) condenser has two outlets. The first outlet represents dry unreacted purified H$_2$ that can be returned to the buffer (1310) as unused fuel. This return path can be combined through the pump (not shown). The second outlet represents water that has been condensed out of the inlet fluid to the humid H$_2$ (1316) condenser. The condensed water can be introduced into the condensed water tank (1315).

The wet air (1317) condenser has two outlets. The first outlet represents water that has been condensed out of the inlet fluid to the wet air (1317) condenser. The condensed water can be introduced into the condensed water tank (1315). The second outlet represents dry air that is exhausted out of the system (1314).

The condensed water tank (1315) provides water to be used with the absorption column (1302), as discussed above. Sufficient water may be condensed out of the two fluids (i.e., humid H$_2$ (1316) and wet air (1317)) in order to provide the needed water for the absorption column (1303).

While not shown, the adsorbent can be configured to provide a warning to the vehicle electronic system when the adsorbent is becoming saturated with ammonia. In such a case, a replacement adsorbent (similar to a filter cartridge) can be used to replace the saturated adsorbent.

In one embodiment it is envisioned that at a fuel cell filling station, the vehicle operator or the filing station attendant can fill up a reservoir with either 1) a starting material such as AB or 2) any hydrogen carrier that is accompanied with an amount of ammonia. In the first case, the starting material may be processed through an AB hydrogen generation process which provides a high H$_2$ yield at low operating temperatures (about 90° C.). However, AB conversion to H$_2$ generates NH$_3$ as a by-product which must be removed before providing the generated hydrogen to the fuel cell. Alternatively, the hydrogen carrier accompanied with ammonia can be provided at the filling station. During the same stop of the vehicle at the filling station, waste product from the system of FIG. 13 can be extracted from the vehicle. For example, water contaminated with ammonia can be removed from the associated tank (1308) for later processing to separate ammonia. In addition, the adsorbent (1306) can also be removed and replaced with a new adsorbent if the adsorbent has been sufficiently saturated with ammonia. According to at least one embodiment of the present disclosure, the hydrogen carrier may be ammonia borane.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A system for generating hydrogen, comprising:
    a first piston;
    a second piston;
    a cylinder, wherein the first piston and second piston are slidably positioned within the cylinder thereby creating a volume between the first piston and second piston;
    at least one inlet configured to receive solid ammonia borane and an inert insulator, wherein the at least one inlet is in communication with the volume between the first piston and the second piston;
    a biasing member configured to bias the first piston toward the second piston;
    a heat exchanger configured to apply heat at a temperature of less than or equal to 90 degrees Celsius to the volume between the first piston and the second piston, wherein when the volume contains the solid ammonia borane and the inert insulator, the applied heat results in generation of hydrogen from the solid ammonia borane; and
    an outlet configured to release the generated hydrogen from the cylinder.

2. The system of claim 1, wherein the second piston has a perforated outer surface.

3. The system of claim 2, wherein the perforations in the outer surface of the second piston comprise the outlet configured to release the generated hydrogen.

4. The system of claim 1, wherein the released hydrogen is provided to a fuel cell.

5. The system of claim 1, wherein the applied heat is at least partially provided as a result of a reaction in the fuel cell.

6. The system of claim 1, wherein the first piston has a solid outer surface.

7. The system of claim 1, wherein the inert insulator is quartz wool.

8. The system of claim 1, wherein the volume is filled with a fluid and/or a powder.

* * * * *